US012810619B2

(12) United States Patent
Madhur et al.

(10) Patent No.: US 12,810,619 B2
(45) Date of Patent: Nov. 24, 2026

(54) SYSTEMS, APPARATUS, AND METHODS FOR DETECTING SCHOOL BUS STOP-ARM VIOLATIONS

(71) Applicant: Hayden AI Technologies, Inc., San Francisco, CA (US)

(72) Inventors: Rajesh Madhur, San Jose, CA (US); Anthony Lobay, San Carlos, CA (US); Patrick L. McGuire, Oakland, CA (US); Matt Mundell, Hayward, CA (US); Thomas Melanson, San Francisco, CA (US); Wenwu Xiu, Rockville, MD (US); Andrei Liaukovich, Warsaw (PL); Michael Gleeson-May, Oakland, CA (US); Vaibhav Ghadiok, Mountain View, CA (US)

(73) Assignee: Hayden AI Technologies, Inc., Oakland, CA (US)

( * ) Notice: Subject to any disclaimer, the term of this patent is extended or adjusted under 35 U.S.C. 154(b) by 0 days.

(21) Appl. No.: 18/798,584

(22) Filed: Aug. 8, 2024

(65) Prior Publication Data

US 2025/0054312 A1 Feb. 13, 2025

Related U.S. Application Data

(60) Provisional application No. 63/518,451, filed on Aug. 9, 2023.

(51) Int. Cl.

| | |
|---|---|
| ***G06V 20/54*** | (2022.01) |
| ***G06V 10/48*** | (2022.01) |
| ***G06V 10/70*** | (2022.01) |

(Continued)

(52) U.S. Cl.

CPC .............. *G06V 20/54* (2022.01); *G06V 10/48* (2022.01); *G06V 10/70* (2022.01); *G06V 20/58* (2022.01);

(Continued)

(58) Field of Classification Search

CPC ........ G06V 20/54; G06V 10/48; G06V 10/70; G06V 20/58; G06V 20/625; G06V 2201/08; H04N 23/50; H04N 23/90; H04N 23/11

See application file for complete search history.

(56) References Cited

U.S. PATENT DOCUMENTS

2006/0269105 A1* 11/2006 Langlinais ............. G06V 10/10 382/105
2015/0338515 A1* 11/2015 Chen ..................... G01S 13/867 342/52

(Continued)

FOREIGN PATENT DOCUMENTS

CN 2277104 3/1998
CN 106560861 4/2017

(Continued)

OTHER PUBLICATIONS

"Consulting services in Computer Vision and AI," accessed on May 8, 2023, online.

(Continued)

*Primary Examiner* — Shadan E Haghani
(74) *Attorney, Agent, or Firm* — Chang & Hale LLP

(57) ABSTRACT

Disclosed herein are methods, devices, and systems for automatically detecting a school bus stop-arm violation. For example, one of the methods can comprise capturing videos of a vehicle using a plurality of cameras of a camera hub coupled to a school bus while the school bus is stopped and at least one stop-arm of the school bus is extended. The (Continued)

method can comprise inputting the videos to a vehicle detection deep learning model and to a vehicle tracker running on a control unit communicatively coupled to the camera hub to detect and track the vehicle as the vehicle passes the stopped school bus. The method can further comprise automatically detecting a license plate number of a license plate of the vehicle from portions of the videos using an automated license plate recognition (ALPR) deep learning model running on the control unit and generating an evidence package of the violation.

18 Claims, 14 Drawing Sheets

(51) Int. Cl.
*G06V 20/58* (2022.01)
*G06V 20/62* (2022.01)
*H04N 23/50* (2023.01)
*H04N 23/90* (2023.01)
*H04N 23/11* (2023.01)

(52) U.S. Cl.
CPC .......... *G06V 20/625* (2022.01); *H04N 23/50* (2023.01); *H04N 23/90* (2023.01); *G06V 2201/08* (2022.01); *H04N 23/11* (2023.01)

(56) References Cited

U.S. PATENT DOCUMENTS

| | | | | |
|---|---|---|---|---|
| 2016/0144788 | A1* | 5/2016 | Perrin, III | H04N 23/90 348/148 |
| 2018/0137753 | A1* | 5/2018 | Bedard | G08G 1/0175 |
| 2021/0406082 | A1* | 12/2021 | Asao | G06F 9/3871 |
| 2023/0237816 | A1* | 7/2023 | Wong | G06N 3/045 382/103 |
| 2023/0367006 | A1 | 11/2023 | Bergen et al. | |

FOREIGN PATENT DOCUMENTS

| | | |
|---|---|---|
| CN | 110197589 | 9/2019 |
| CN | 110321823 | 10/2019 |
| CN | 110717433 | 1/2020 |
| CN | 111368687 | 7/2020 |
| CN | 111492416 | 8/2020 |
| CN | 111666853 | 9/2020 |
| JP | 4805763 | 3/2008 |
| KR | 100812397 | 3/2008 |
| WO | WO 2010/081200 | 7/2010 |
| WO | WO 2014/007762 | 1/2014 |
| WO | WO 2020/063866 | 4/2020 |
| WO | WO 2020/177767 | 9/2020 |
| WO | WO 2022/099237 | 5/2022 |

OTHER PUBLICATIONS

"Safety Vision Announces Smart Automated Bus Lane Enforcement (SABLETM) Solution," *Safety Vision*, Oct. 11, 2022, online.
Bo, T. et al., "Common phase error estimation in coherent optical OFDM systems using best-fit bounding box," *Optics Express*, vol. 24, No. 21, pp. 73707-23718, Oct. 2016.
Bo, T. et al., "Common Phase Estimation in Coherent OFDM System Using Image Processing Technique," *IEEE Photonics Technology Letters*, vol. 27, No. 15, pp. 1597-1600, Aug. 2015.
Bo, T. et al., "Image Processing Based Common Phase Estimation for Coherent Optical Orthogonal Frequency Division Multiplexing System," *Optical Fiber Communication Conference*, Mar. 2015.
Buspatrol, <https://buspatrol.com/> (Accessed Aug. 6, 2024).
Canizo, M. et al. "Multi-Head CNN-RNN for multi time series anomaly detection: An industrial case study," *Neurocomputing*, vol. 363(21), pp. 246-260, Oct. 21, 2019.
Chen, S. et al., "A Dense Feature Pyramid Network-Based Deep Learning Model for Road Marking Instance Segmentation Using MLS Point Clouds," *IEEE Transactions on Geoscience and Remote Sensing*, vol. 59, No. 1, pp. 784-800, Jan. 2021.
Chhaya, S. et al., "Basic Geometric Shape and Primary Colour Detection Using Image Processing on MATLAB," *IJRET: International Journal of Research in Engineering and Technology*, vol. 04, iss. 05, pp. 505-509, May 2015.
Clearlane, "Automated Bus Lane Enforcement System", *SafeFleet*, 2021, online.
Clearlane, "The Safe Fleet Automated Bus Lane Enforcement (ABLE)", *SafeFleet*, 2021, online.
Evanko, K. "Siemens Mobility launches first-ever mobile bus lane enforcement solution in New York," *Siemens Mobility*, Dec. 17, 2019, Munich, Germany.
Fan, Y. et al., "A Coarse-to-Fine Framework for Multiple Pedestrian Crossing Detection," *Sensors*, vol. 20, 4144, pp. 1-16, Jul. 2020.
Franklin, R. "Traffic Signal Violation Detection using Artificial Intelligence and Deep Learning," *Department of Electronic & Telecommunication Engineering, RV College of Engineering*, pp. 839-844, accessed on Jul. 19, 2020, Karnataka, India.
Github Repository, Our Camera, <https://github.com/Bellspringsteen/OurCamera> (last visited Sep. 25, 2023).
Glenn, J., Adaptive Morphological Feature-Based Object Classifier for a Color Imaging System, *NASA Tech Briefs*, pp. 23-24, Dec. 2009.
Hartley, R. et al., "Multiple View Geometry in Computer Vision Second Edition," *Cambridge University Press*, pp. 25-64, 2003.
Hsu, K., et al. "Augmented Multiple Instance Regression for Inferring Object Contours in Bounding Boxes," *IEEE Transaction on Image Processing*, vol. 23, No. 4, pp. 1722-1736, Apr. 2014.
Huval, B. et al. "An Empirical Evaluation of Deep Learning on Highway Driving," *Stanford University*, pp. 1-7 accessed on Apr. 17, 2015, online.
Liu, X. "Vehicle-Related Scene Understanding Using Deep Learning," *School of Engineering, Computer and Mathematical Sciences, Auckland University of Technology*, 2019, online.
Nehemiah, A. et al. "Deep Learning for Automated Driving with MATLAB," *NVIDIA Technical Blog*, <https://developer.nvidia.com/blog/deep-learning-automated-driving-matlab/> accessed on Jun. 4, 2023, online.
Novak, L., "Vehicle Detection and Pose Estimation for Autonomous Driving," *Czech Technical University in Prague*, May 2017.
Oh, J. et al., "Context-based abnormal object detection using the fully-connected conditional random fields," *Pattern Recognition Letters*, vol. 98, pp. 16-25, Aug. 2017.
Paquet, E. et al., "Description of shape information for 2-D and 3-D objects," *Signal Processing: Image Communication*, vol. 16, pp. 103-122, Sep. 2000.
Safe Fleet. "Whitepaper: Vendor Interoperability for ABLE," *Safe Fleet*, pp. 1-6, Apr. 2023, online.
Sengupta, S., "Semantic Mapping of Road Scenes," Oxford Brookes University, Oct. 2014.
Siemens Mobility Inc., "Ratification of Completed Procurement Actions" New York City Transit and Siemens Mobility Inc., *Finance Committee Meeting*, pp. 80-81, Mar. 2019.
Siemens Mobility Traffic Solutions, "Enforcement solutions for safe and efficient cities," *Civil Enforcement*, 2016.
Spencer, B. et al. "NYC extends Brooklyn bus lane enforcement," *ITS International*, Feb. 27, 2020, online.
Sullivan, T. "Transit Bus Surveillance Solutions," *New York City Transit/MTA Bus*, Jun. 21, 2019, Charlotte, North Carolina, USA.
Tonge, A. et al., "Traffic Rules Violation Detection using Deep Learning," *2020 4th International Conference on Electronics, Communication and Aerospace Technology (ICECA)*, pp. 1250-1257, Nov. 2020, Coimbatore, India.
Viorel, C., "Some Aspects Concerning Geometric Forms Automatically Find Images and Ordering Them Using Robot Studio Simulation," *Advanced Materials Research*, vol. 1036, pp. 760-763, Oct. 1, 2014.

(56) References Cited

OTHER PUBLICATIONS

Wu, C. et al. "Adjacent Lane Detection and Lateral Vehicle Distance Measurement Using Vision-Based Neuro-Fuzzy Approaches," *Journal of Applied Research and Technology*, vol. 11, pp. 251-258, Apr. 2013.
Zhao Z. et al., "Deep Reinforcement Learning Based Lane Detection and Localization," *Neurocomputing*, vol. 413, pp. 328-338, Jul. 2020.
Zhou, C. et al., "Predicting the passenger demand on bus services for mobile users," *Pervasive and Mobile Computing*, vol. 25, pp. 48-66, Jan. 2016.

* cited by examiner

Context video frame image captured by rear context camera as a vehicle begins to pass the bus from the rear:

Context video frame image captured by front context camera as the vehicle passes the bus:

LPR video frame image captured by rear LPR camera as a vehicle begins to pass the bus from the rear:

LPR video frame image captured by front LPR camera as the vehicle passes the bus:

SYSTEMS, APPARATUS, AND METHODS FOR DETECTING SCHOOL BUS STOP-ARM VIOLATIONS

CROSS-REFERENCE TO RELATED APPLICATION

This application claims the benefit of U.S. Provisional Patent Application No. 63/518,451 filed on Aug. 9, 2023, the content of which is incorporated herein by reference in its entirety.

TECHNICAL FIELD

This disclosure relates generally to the field of computer-based detection of vehicular traffic violations and, more specifically, to systems, apparatus, and methods for automatically detecting school bus stop-arm violations.

BACKGROUND

In every state, it is illegal for a driver of a vehicle to pass a school bus when the school bus is stopped and the stop-arm or stop signal arm of the school bus is extended with one or more red lights flashing. The act of illegally passing a stopped school bus with its stop-arm extended and red lights flashing is commonly known as a "stop-arm violation." Stop-arm violations pose a significant threat to the safety of children and others on the road. However, enforcement of stop-arm violations is challenging.

School bus drivers are the primary witnesses to these types of violations. However, school bus drivers are often not sufficiently informed about the details of local traffic laws or about how to report violations in a way that would allow enforcement to take place. Also, enforcement is not seen as a primary part of the job of a school bus driver, especially when such drivers are already very busy managing students and operating the school bus. Moreover, it is often difficult for school bus drivers to accurately record the license plate number of a passing vehicle.

If law enforcement officers witness a stop-arm violation, such law enforcement officers can issue a traffic ticket. However, consistent enforcement would require a law enforcement officer to essentially follow a school bus along its entire route, which is not feasible for most law enforcement departments.

Given the difficulty of enforcing stop-arm violations, either by law enforcement officers or school bus drivers, an existing solution is to rely on human reviewers to monitor activity around school buses remotely. In these situations, a human operator (typically employed by a vendor contracted to undertake such reviews) remotely monitors an incoming video stream, reviews the video stream, and forwards evidence of violations to a government agency or law enforcement department. However, most jurisdictions require that violation notices be issued in a timely manner (e.g., several days from the date of the violation). This necessitates that staff be constantly available to quickly review a high volume of raw video data received from a school bus fleet. This makes remote monitoring a highly labor-intensive and, therefore, costly solution. Remote monitoring also requires complex and costly monitoring equipment that can be difficult to install and maintain.

Another remote-monitoring solution is to limit the amount of data sent to a human reviewer. In these cases, an additional sensor, such as radar, can be used to identify possible vehicle motion. This approach reduces the amount of data that is passed to a human operator for review. However, this approach results in transmitting a large amount of evidentiary data not representative of vehicle motion or violations since radar oftentimes detects any type of motion such as motion caused by wind or other types of motion unrelated to vehicular movement. While additional sensors might reduce the overall volume of data transmitted and reviewed, it does not reduce the amount of data to a point where it is more cost-effective than traditional remote monitoring.

Therefore, an improved school bus stop-arm violation detection solution is needed that can detect school bus stop-arm violations automatically without relying on human reviewers. Such a solution should be accurate, scalable, and cost-effective to deploy and operate.

SUMMARY

Disclosed are systems, apparatus, and methods for automatically detecting school bus stop-arm violations. In some embodiments, a method of automatically detecting a school bus stop-arm violation comprises capturing videos of a vehicle using a plurality of cameras of a camera hub coupled to an exterior side of a school bus while the school bus is stopped and at least one stop-arm of the school bus is extended. The method can comprise inputting the videos to a vehicle detection deep learning model and to a vehicle tracker running on a control unit communicatively coupled to the camera hub to detect and track the vehicle as the vehicle passes the school bus while the school bus is stopped and the at least one stop-arm is extended. The method can further comprise automatically recognizing a license plate number of a license plate of the vehicle from portions of the videos using an automated license plate recognition (ALPR) deep learning model running on the control unit and generating, using the control unit, an evidence package. The evidence package can comprise portions of the videos captured by the plurality of cameras and the license plate number of the vehicle.

In some embodiments, tracking the vehicle can further comprise generating tracklets of the vehicle detected from one or more videos captured by each of the cameras and generating a full-scene track of the vehicle across the plurality of cameras using the images coordinates from the tracklets. Each of the tracklets can be a sequence of image coordinates of the vehicle detected from the one or more videos.

In some embodiments, generating the full-scene track can further comprise estimating image coordinates of the license plate of the vehicle across multiple videos.

In some embodiments, generating the full-scene track can further comprise associating the image coordinates from at least one of the tracklets with one or more of the other tracklets using a homography transform algorithm.

In some embodiments, automatically recognizing the license plate number can further comprise obtaining predictions from the ALPR deep learning model concerning the license plate number and obtaining confidence values associated with the predictions and selecting one license plate number composed of alphanumeric characters based on the predictions and the confidence values.

In some embodiments, the method can further comprise generating the full-scene track of the vehicle while the school bus is in motion.

In some embodiments, the method can further comprise automatically recognizing the license plate number of the license plate of the vehicle from portions of one or more videos captured by the one or more context cameras.

In some embodiments, the method can further comprise dynamically adjusting an exposure and gain of a video frame of one of the videos by estimating a location of the license plate of the vehicle.

Also disclosed is a system for automatically detecting a school bus stop-arm violation. The system can comprise a camera hub configured to be coupled to an exterior side of a school bus in between two immediately adjacent windows of the school bus. The camera hub can comprise a plurality of cameras configured to capture videos of a vehicle while the school bus is stopped and at least one stop-arm of the school bus is extended. The system can further comprise a control unit communicatively coupled to the camera hub. The control unit can comprise one or more processors programmed to execute instructions to: input the videos to a vehicle detection deep learning model and to a vehicle tracker running on a control unit communicatively coupled to the camera hub to detect and track the vehicle as the vehicle passes the school bus while the school bus is stopped and the at least one stop-arm is extended, automatically recognize a license plate number of a license plate of the vehicle from portions of the videos using an automated license plate recognition (ALPR) deep learning model running on the control unit, and generate an evidence package. The evidence package can comprise portions of the videos captured by the plurality of cameras and the license plate number of the vehicle.

In some embodiments, the plurality of cameras of the camera hub can comprise one or more context cameras, a front license plate recognition (LPR) camera, and a rear LPR camera. The one or more context cameras, the front LPR camera, and the rear LPR camera can be housed at least partially within the camera hub.

In some embodiments, the one or more context cameras can comprise at least a front context camera and a rear context camera. In alternative embodiments, the camera hub can comprise a singular context camera.

In some embodiments, the camera hub can be configured to be coupled to the exterior side of the school bus in between two immediately adjacent windows of the school bus.

In some embodiments, the camera hub can further comprise a front infrared (IR) light array and a rear IR light array. The rear IR light array can be positioned along the rear facing side and the front IR light array can be positioned along the front facing side.

In some embodiments, at least one of the front LPR camera and the rear LPR camera can be an RGB-IR camera. In certain embodiments, at least one of the front context camera and the rear context camera can be an RGB-IR camera.

In some embodiments, the camera hub can further comprise a breather vent made in part of a polymeric membrane. The breather vent can allow a housing pressure within the camera hub to equalize without allowing liquid water or water vapor to pass through.

In some embodiments, the camera hub can comprise a rear side configured to face the exterior side of the school bus when the camera hub is coupled to the school bus. The breather vent can be positioned along the rear side of the camera hub.

In some embodiments, the camera hub can further comprise at least one resistive heater configured to heat a part of a camera hub housing surrounding a camera lens of one of the cameras of the camera hub to prevent snow from accumulating around the camera lens.

Also disclosed are one or more non-transitory computer-readable media comprising instructions stored thereon, that when executed by one or more processors, perform steps, comprising: inputting videos captured by a plurality of cameras of a camera hub configured to be coupled to a school bus to a vehicle detection deep learning model and to a vehicle tracker to detect and track a vehicle as the vehicle passes the school bus while the school bus is stopped and at least one stop-arm of the school bus is extended, automatically recognizing a license plate number of a license plate of the vehicle from portions of the videos using an automated license plate recognition (ALPR) deep learning model, and generating an evidence package. The evidence package can comprise portions of the videos captured by the plurality of cameras and the license plate number of the vehicle.

DETAILED DESCRIPTION

Figure 1A:
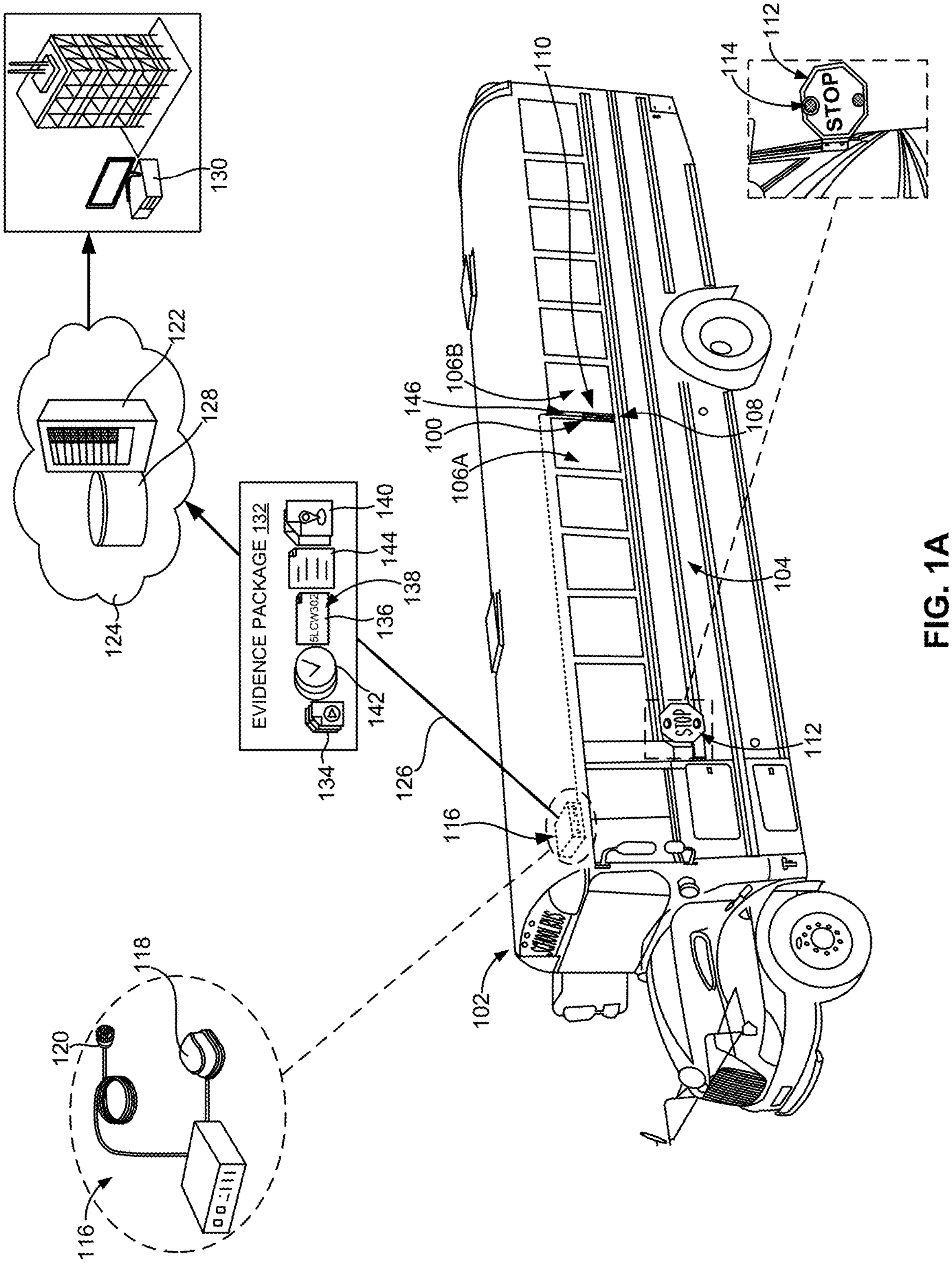
FIG. 1A illustrates one embodiment of a camera hub coupled to an exterior side of a school bus for detecting school bus stop-arm violations.

FIG. 1A illustrates one embodiment of a camera hub 100 for detecting school bus stop-arm violations coupled to an exterior side of a school bus 102 for detecting school bus stop-arm violations. The camera hub 100 can be configured to be mounted, fastened (e.g., via screws, bolts, etc.), adhered, or otherwise coupled to an exterior side of the school bus 102.

As shown in FIG. 1A, the camera hub 100 can be mounted, fastened, adhered, or otherwise coupled to a lateral side 104 of the school bus 102 at a location in between a top or roof of the school bus 102 and a bottom portion (e.g., above a wheel well) of the school bus 102. For example, the camera hub 100 can be mounted, fastened, adhered, or otherwise coupled to the exterior lateral side 104 of the school bus 102 on the driver's side or opposite a bus door side or the side of the school bus 102 with service doors for passenger ingress and egress.

In some embodiments, the camera hub 100 can be mounted, fastened, adhered, or otherwise coupled to the exterior side of the school bus 102 in between two immediately adjacent windows (e.g., windows 106A and 106B). For example, the camera hub 100 can be mounted, fastened, adhered, or otherwise coupled to part of a window frame 146 of the school bus 102.

In these embodiments, the camera hub 100 can be mounted, fastened, adhered, or otherwise coupled to a longitudinal midpoint 108 of the school bus 102. The longitudinal midpoint 108 can be a location along a longitudinal axis (or length) of the school bus 102 that is approximately a midpoint along the longitudinal axis (or the length) of the school bus 102.

The camera hub 100 can also be mounted, fastened, adhered, or otherwise coupled to a vertical midpoint 110 of the school bus 102 or slightly above the vertical midpoint 110 of the school bus 102. The vertical midpoint 110 can be a location along a vertical axis (or height) of the school bus 102 that is approximately a midpoint along the vertical axis (or the height) of the school bus 102. For example, the camera hub 100 can be mounted, fastened, adhered, or otherwise coupled immediately above a top-most bumper rail running along the lateral side 104 of the school bus 102.

In alternative embodiments, the camera hub 100 can be mounted, fastened, adhered, or otherwise coupled immediately below the top-most bumper rail and above a bumper rail immediately below the top-most bumper rail.

In certain embodiments, the camera hub 100 can also be mounted, fastened, adhered, or otherwise coupled to a location along the lateral side 104 of the school bus 102 that is both the longitudinal midpoint 108 and the vertical midpoint 110 (or slightly above the vertical midpoint 110).

In these embodiments, the camera hub 100 is not fastened, adhered, or otherwise coupled to the roof or near the roof of the school bus or to a transition area or interface region between the roof of the school bus 102 and the lateral side 104 of the school bus 102.

FIG. 1A also illustrates that the school bus 102 can comprise at least one stop-arm 112 or stop signal arm. The stop-arm 112 can be a mechanically-articulating arm with a stop sign attached or otherwise coupled to the mechanically-articulating arm As shown in the lower-right inset figure in FIG. 1A, the stop-arm 112 can articulate out or extend out when the school bus 102 is parked or stopped for purposes of loading or unloading passengers (e.g., students).

The stop-arm 112 can also comprise one or more lights 114 that flash (e.g., flashing red lights) or blink to signal that the school bus 102 is in the process or stopping or is stopped for the purpose of dropping off or picking up passengers (e.g., students). The one or more lights 114 can cease to flash when the stop-arm 112 is retracted and the school bus 102 is in motion.

In some embodiments, the school bus 102 can comprise two stop-arms 112. In these embodiments, the camera hub 100 can be coupled to a location along the lateral side 104 of the school bus 102 that is in between the two stop-arms 112. For example, the camera hub 100 can be coupled to a location along the lateral side 104 of the school bus 102 that is equidistant in between the two stop-arms 112.

As shown in FIG. 1A, the camera hub 100 can be communicatively coupled to a control unit 116. The control unit 116 can be fastened, adhered, or otherwise coupled to an interior of the school bus 102. In some embodiments, the control unit 116 can be fastened, adhered, or otherwise coupled to a ceiling or headliner of the school bus 102 via one or more mounts or brackets.

The camera hub 100 can be communicatively coupled to the control unit 116 via one or more wired or wireless connections. In some embodiments, the camera hub 100 can be communicatively coupled to the control unit 116 via one or more high-speed wired connections.

As will be discussed in more detail in the following sections, the camera hub 100 can comprise a plurality of cameras 200 (see, e.g., FIGS. 2A-2B and 3A-3C). The control unit 116 can be connected to the cameras 200 of the camera hub 100 via one or more high-speed camera interfaces such as a Mobile Industry Processor Interface (MIPI) camera serial interfaces.

In other embodiments, the camera hub 100 can be communicatively coupled to the control unit 116 via one or more wireless connections such as one or more short-range wireless communication protocols such as a Bluetooth™ (IEEE 802.15.1) or Bluetooth™ Lower Energy (BLE) short-range communication protocol, a wireless fidelity (Wi-Fi) (IEEE 802.11) communication protocol, an ultra-wideband (UWB) (IEEE 802.15.3) communication protocol, a ZigBee™ (IEEE 802.15.4) communication protocol, or a combination thereof.

The control unit 116 can comprise a plurality of processors, memory and storage units, and inertial measurement units (IMUs). The processors of the control unit 116 can comprise one or more central processing units (CPUs), graphical processing units (GPUs), Application-Specific Integrated Circuits (ASICs), field-programmable gate arrays (FPGAs), or a combination thereof. The processors can execute software stored in the memory and storage units to execute the methods or instructions described herein.

For example, the processors can refer to one or more GPUs and CPUs of a processor module configured to perform operations or undertake calculations. As a more specific example, the processors can perform operations or undertake calculations at a terascale. In some embodiments, the processors of the control unit can be configured to perform operations at 21 teraflops (TFLOPS).

The processors of the control unit 116 can be configured to run multiple deep learning models or neural networks in parallel and process video streams received from the plurality of cameras 200 of the camera hub 100. More specifically, one or more of the processors of the control unit 116 can be NVIDIA® processors.

The processors can comprise at least one GPU having a plurality of processing cores (e.g., between 300 and 400 processing cores) and tensor cores, at least one CPU (e.g., at least one 64-bit CPU having multiple processing cores), and a deep learning accelerator (DLA) or other specially designed circuitry optimized for deep learning algorithms.

In some embodiments, at least part of the processors' processing power can be utilized for object detection, object tracking, and license plate recognition. In these embodiments, at least part of the GPU's processing power or the DLA's processing power can be utilized for object detection, object tracking, and license plate recognition. In certain embodiments, at least part of the CPU's processing power can be used for simultaneous localization and mapping. The CPU's processing power can also be used to run other functions and maintain the operation of the control unit 116.

The memory and storage units of the control unit 116 can comprise volatile memory and non-volatile memory or storage. For example, the memory and storage units can comprise flash memory or storage such as one or more solid-state drives, dynamic random access memory (DRAM) or synchronous dynamic random access memory (SDRAM) such as low-power double data rate (LPDDR) SDRAM, and embedded multi-media controller (eMMC) storage. For example, the memory and storage units can comprise a 512 gigabyte (GB) SSD, an 8 GB 128-bit LPDDR4x memory, and 16 GB eMMC 5.1 storage device. The memory and storage units can store software, firmware, data (including video and image data), tables, logs, databases, or a combination thereof.

The IMUs of the control unit 116 can comprise a 3-axis accelerometer and a 3-axis gyroscope. For example, the 3-axis accelerometer can be a 3-axis microelectromechanical system (MEMS) accelerometer and a 3-axis MEMS gyroscope. As a more specific example, the IMUs can be a low-power 6-axis IMU provided by Bosch Sensortec GmbH.

The control unit 116 can also comprise a communication and positioning unit 118. The communication and positioning unit 118 can comprise at least one of a cellular communication module, a Wi-Fi communication module, a Bluetooth® communication module, and a high-precision automotive-grade positioning unit.

For example, the cellular communication module can support communications over a 5G network or a 4G network (e.g., a 4G long-term evolution (LTE) network) with automatic fallback to 3G networks. The cellular communication module can comprise a number of embedded SIM cards or embedded universal integrated circuit cards (eUICCs) allowing the device operator to change cellular service providers over-the-air without needing to physically change the embedded SIM cards. As a more specific example, the cellular communication module can be a 4G LTE Cat-12 cellular module.

The Wi-Fi communication module can allow the control unit to communicate over a Wi-Fi network such as a Wi-Fi network provided by the school bus 102, a municipality, a business, or a combination thereof. The Wi-Fi communication module can allow the control unit to communicate over one or more Wi-Fi (IEEE 802.11) communication protocols such as the 802.11n, 802.11ac, or 802.11ax protocol.

The Bluetooth® module can allow the control unit to communicate with other control units 116 on other school buses 102 over a Bluetooth® communication protocol (e.g., Bluetooth® basic rate/enhanced data rate (BR/EDR), a Bluetooth® low energy (BLE) communication protocol, or a combination thereof). The Bluetooth® module can support a Bluetooth® v4.2 standard or a Bluetooth v5.0 standard. In some embodiments, the wireless communication modules can comprise a combined Wi-Fi and Bluetooth® module.

The communication and positioning unit 118 can comprise a multi-band global navigation satellite system (GNSS) receiver configured to concurrently receive signals from a GPS satellite navigation system, a GLONASS satellite navigation system, a Galileo navigation system, and/or a BeiDou satellite navigation system. For example, the communication and positioning unit 118 can comprise a multi-band GNSS receiver configured to concurrently receive signals from at least two satellite navigation systems including the GPS satellite navigation system, the GLONASS satellite navigation system, the Galileo navigation system, and the BeiDou satellite navigation system. In other embodiments, the communication and positioning unit 118 can be configured to receive signals from all four of the aforementioned satellite navigation systems or three out of the four satellite navigation systems. For example, the communication and positioning unit 118 can comprise a ZED-F9K dead reckoning module provided by u-blox holding AG.

The communication and positioning unit 118 can provide positioning data that can allow the school bus 102 to determine its own location at a centimeter-level accuracy. The communication and positioning unit 118 can also provide positioning data that can be used by the control unit 116 to determine the location of an offending vehicle. For example, the control unit 116 can use positioning data concerning its own location to substitute for the location of the offending vehicle. The control unit 116 can also use positioning data concerning its own location to estimate or approximate the location of the offending vehicle.

In certain embodiments, the control unit 116 can also comprise a vehicle bus connector 120 for connecting the control unit 116 to one or more electronic control units (ECUs) of the school bus 102. The vehicle bus connector 120 can allow the control unit 116 to obtain wheel odometry data from a wheel odometer or engine revolutions per minute (RPMs) from the engine of the school bus 102. For example, the vehicle bus connector 120 can be a J1939 connector (e.g., a nine-pin A-J connector). The control unit 116 can take such data into account in order to determine the location of the school bus 102 and/or estimate the location of the offending vehicle.

The control unit 116 can also comprise a power management integrated circuit (PMIC). The PMIC can be used to manage power from a power source. In some embodiments, the components of the control unit 116 and/or the camera hub 100 can be powered by a portable power source such as a battery. In other embodiments, one or more components of the control unit 116 and/or the camera hub 100 can be powered via a physical connection (e.g., a power cord) to a power outlet or direct-current (DC) auxiliary power outlet (e.g., 12V/24V) of the school bus 102.

For purposes of this disclosure, any references to the control unit 116 can also be interpreted as a reference to a specific component, processor, module, chip, or circuitry within the control unit 116.

The control unit 116 can be communicatively coupled to or in wireless communication with a server 122 in a cloud computing environment 124.

The server 122 can comprise or refer to one or more cloud servers, virtual servers, or virtualized computing resources. For example, the server 122 can refer to a cloud server or virtual server hosted and delivered by a cloud computing platform (e.g., Amazon Web Services®, Microsoft Azure®, or Google Cloud®).

In other embodiments, the server 122 can refer to one or more stand-alone servers such as a rack-mounted server, a blade server, a mainframe, a dedicated desktop or laptop computer, one or more processors or processor cores therein, or a combination thereof.

The control unit 116 can communicate with the server 122 over one or more communication networks. In some embodiments, the communication networks can refer to one or more wide area networks (WANs) such as the Internet or other smaller WANs, wireless local area networks (WLANs), local area networks (LANs), wireless personal area networks (WPANs), system-area networks (SANs), metropolitan area networks (MANs), campus area networks (CANs), enterprise private networks (EPNs), virtual private networks (VPNs), multi-hop networks, or a combination thereof.

The server 122 and the control unit 116 can connect to the communication network using any number of wired connections (e.g., Ethernet, fiber optic cables, etc.), wireless connections established using a wireless communication protocol or standard such as a 3G wireless communication standard, a 4G wireless communication standard, a 5G wireless communication standard, a long-term evolution (LTE) wireless communication standard, a Bluetooth™ (IEEE 802.15.1) or Bluetooth™ Lower Energy (BLE) short-range communication protocol, a wireless fidelity (Wi-Fi) (IEEE 802.11) communication protocol, an ultra-wideband (UWB) (IEEE 802.15.3) communication protocol, a ZigBee™ (IEEE 802.15.4) communication protocol, or a combination thereof.

The control unit 116 can transmit data and files to the server 122 and receive data and files from the server 122 via secure connections 126. The secure connections 126 can be real-time bidirectional connections secured using one or more encryption protocols such as a secure sockets layer (SSL) protocol, a transport layer security (TLS) protocol, or a combination thereof. Additionally, data or packets transmitted over the secure connection 126 can be encrypted using a Secure Hash Algorithm (SHA) or another suitable encryption algorithm. Data or packets transmitted over the secure connection 126 can also be encrypted using an Advanced Encryption Standard (AES) cipher.

The server 122 can store data and files received from the control unit 116 in at least one database 128 in the cloud computing environment 124. In some embodiments, the database 128 can be a relational database. In further embodiments, the database 128 can be a column-oriented or key-value database. In certain embodiments, the database 128 can be stored in a server memory or storage unit of the server 122. In other embodiments, the database 128 can be distributed among multiple storage nodes.

FIG. 1A also illustrates that the server 122 can be communicatively coupled to a computing device 130. The server 122 can transmit certain data and files to and receive certain data and files from the computing device 130.

In some embodiments, the computing device 130 can be a server or computing resource of a third-party traffic violation processor (e.g., a vendor hired by a law enforcement agency or government agency to review traffic violations). In other embodiments, the computing device 130 can be a server or computing resource of a law enforcement agency or government agency (e.g., a government transportation department or a department of motor vehicles) responsible for enforcing traffic violations for a municipality or other government entity.

In certain embodiments, the computing device 130 can be a portable or non-portable computing device used by a user to communicate with the server 122. For example, the computing device 130 can be a desktop computer or a laptop computer. In other embodiments, the computing device 130 can be a tablet computer or smartphone.

In some embodiments, server 122 can transmit an evidence package 132 prepared or generated by the control unit 116 to the computing device 130. The server 122 can receive the evidence package 132 from the control unit 116. Although FIG. 1A illustrates the server 122 receiving the evidence package 132 from the control unit 116 of one school bus 102, it is contemplated by this disclosure and it should be understood by one of ordinary skill in the art that the server 122 can receive evidence packages 132 from multiple control units 116 (where each control unit 116 is coupled to its own school bus 102).

The evidence package 132 can comprise portions, snippets, or video frame images of videos 134 captured by the cameras 200 of the camera hub 100 showing a vehicle committing a school bus stop-arm violation (referred to herein as an offending vehicle). In certain embodiments, the evidence package 132 can also comprise a mosaic or composite video generated from the portions or snippets of videos 134 captured by the cameras 200 of the camera hub 100.

The evidence package 132 can also comprise a license plate number 136 of the offending vehicle. As will be discussed in more detail in the following sections, the license plate number 136 of the offending vehicle can be automatically recognized from snippets or portions of videos 134 or video frames containing a license plate 138 of the offending vehicle.

In some embodiments, the evidence package 132 can also comprise a location 140 of the offending vehicle as determined or estimated from positioning data obtained from the communication and positioning unit 118 of the control unit 116. The evidence package 132 can also comprise timestamps 142 recorded by the control unit 116 at the time that the school bus 102 was stopped, the time that the stop-arm 112 was deployed, and the time that the offending vehicle was detected. The evidence package 132 can further comprise one or more vehicle attributes 144 of the offending vehicle automatically detected by the control unit 116 based on snippets or portions of videos 134 captured by the one or more cameras 200.

Figure 1B:
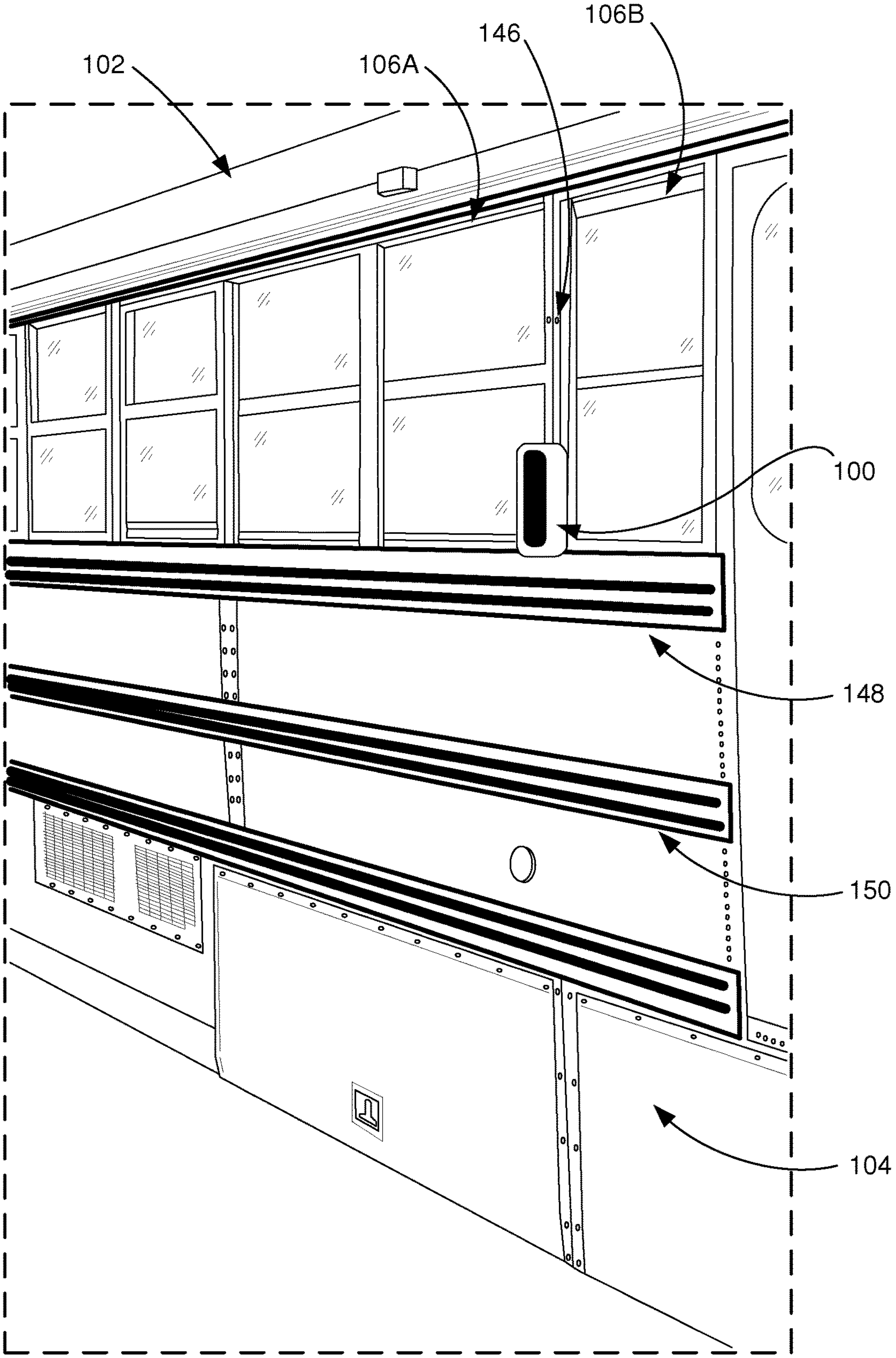
FIG. 1B is a close-up perspective view of the camera hub coupled to the exterior side of a school bus.

FIG. 1B is a close-up perspective view of one embodiment of the camera hub 100 coupled to an exterior lateral side 104 of a school bus 102. In some embodiments, the camera hub 100 can be configured to be coupled to the exterior lateral side 104 of the driver's side of the school bus 102 in between two immediately adjacent windows (for example, windows 106A and 106B). In certain embodiments, the camera hub 100 can be configured to be coupled to part of a window frame 146 of the school bus 102.

The camera hub 100 can be configured to be coupled immediately above a top-most bumper rail 148 running along the lateral side 104 of the school bus 102. Alternatively, the camera hub 100 can be configured to be coupled immediately below the top-most bumper rail 148 and above a middle bumper rail 150 immediately below the top-most bumper rail 148.

Figure 2A:
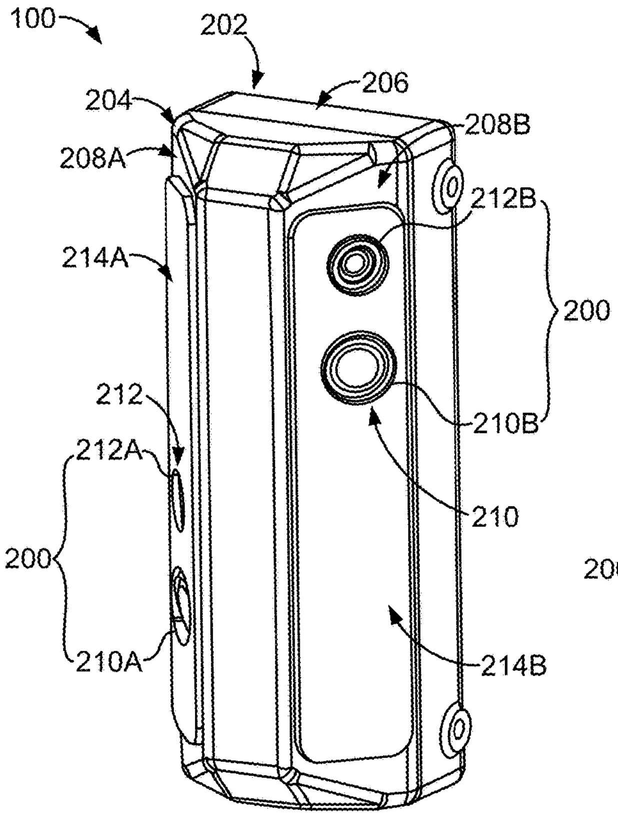
FIG. 2A illustrates a perspective view of one embodiment of a camera hub configured to be coupled to the exterior side of the school bus.
Figure 2B:
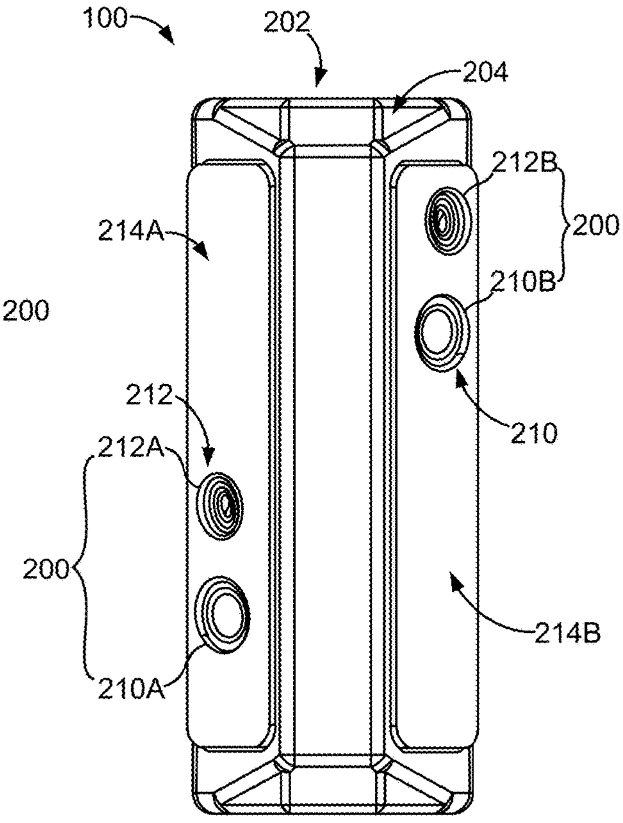
FIG. 2B illustrates a front view of the camera hub.

FIGS. 2A and 2B illustrate perspective and front views, respectively, of one embodiment of the camera hub 100 configured to be coupled to the exterior lateral side 104 of the school bus 102. The camera hub 100 can comprise a plurality of cameras 200 at least partially housed within a camera hub housing 202 of the camera hub 100. The camera lens of each of the cameras 200 can be exposed or unobscured by the camera hub housing 202.

The camera hub housing 202 can have an elongated housing body to allow the camera hub 100 to be coupled to part of the window frame 146 (see, e.g., FIGS. 1A and 1B) of a school bus 102. For example, the camera hub housing 202 can have a length dimension that is greater than a width dimension of the camera hub housing 202. As a more specific example, the length dimension of the camera hub housing 202 can be more than double or triple the width dimension of the camera hub housing 202.

The camera hub housing 202 can comprise a camera mounting portion 204 and a bus attachment portion 206. The camera mounting portion 204 can be an anterior or forward-facing portion of the camera hub housing 202. The camera mounting portion 204 can protrude out laterally from the exterior lateral side 104 of the school bus 102 when the camera hub 100 is coupled to the school bus 102.

The camera mounting portion 204 can comprise a forward-facing side 208A and a rearward-facing side 208B. The forward-facing side 208A of the camera mounting portion 204 can substantially face or can be orientated in a forward direction or toward a front of the school bus 102 when the camera hub 100 is coupled to the exterior lateral side 104 of the school bus 102 (see, e.g., FIGS. 1A and 1B). In certain embodiments, the forward-facing side 208A of the camera mounting portion 204 can be angled or askew with respect to the actual front or front windshield of the school bus 102 when the camera hub 100 is coupled to the exterior lateral side 104 of the school bus 102 (see, e.g., FIGS. 1A and 1B). The forward-facing side 208A can be oriented at an oblique angle with respect to the exterior lateral side 104 of the school bus 102 when the camera hub 100 is coupled to the school bus 102.

The rearward-facing side 208B of the camera mounting portion 204 can substantially face or can be orientated in a rearward direction or toward a rear of the school bus 102 when the camera hub 100 is coupled to the exterior lateral side 104 of the school bus 102 (see, e.g., FIGS. 1A and 1B). In certain embodiments, the rearward-facing side 208B of the camera mounting portion 204 can be angled or askew with respect to the actual rear or rear windows of the school bus 102 when the camera hub 100 is coupled to the exterior lateral side 104 of the school bus 102 (see, e.g., FIGS. 1A and 1B). The rearward-facing side 208B can be oriented at an oblique angle with respect to the exterior lateral side 104 of the school bus 102 when the camera hub 100 is coupled to the school bus 102.

The bus attachment portion 206 can be a posterior or base portion of the camera hub housing 202 for attaching or otherwise coupling the camera hub 100 to the exterior lateral side 104 of the school bus 102. In some embodiments, the bus attachment portion 206 can be contiguous with the camera mounting portion 204 such that the bus attachment portion 206 and the camera mounting portion 204 refer to different parts of the same camera hub housing 202. In alternative embodiments, the bus attachment portion 206 can be attached or coupled to the camera mounting portion 204.

The plurality of cameras 200 of the camera hub 100 can comprise one or more context cameras 210 and a plurality of license plate recognition (LPR) cameras 212. In some embodiments, the camera hub 100 can comprise a front context camera 210A, a rear context camera 210B, a front LPR camera 212A, and a rear LPR camera 212B.

The front context camera 210A and the front LPR camera 212A can be positioned along the forward-facing side 208A of the camera mounting portion 204 of the camera hub 100. The rear context camera 210B and the rear LPR camera 212B can be positioned along the rearward-facing side 208B of the camera mounting portion 204 of the camera hub 100.

In some embodiments, the front context camera 210A can be positioned vertically below or underneath the front LPR camera 212A. For example, the front context camera 210A can be positioned vertically below or underneath the front LPR camera 212A when both the front context camera 210A and the front LPR camera 212A are positioned along the forward-facing side 208A.

In some embodiments, the rear context camera 210B can be positioned vertically below or underneath the rear LPR camera 212B. For example, the rear context camera 210B can be positioned vertically below or underneath the rear LPR camera 212B when both the rear context camera 210B and the rear LPR camera 212B are positioned along the forward-facing side 208A.

In certain alternative embodiments, the front context camera 210A can be positioned vertically above or on top of the front LPR camera 212A. For example, the front context camera 210A can be positioned vertically above or on top of the front LPR camera 212A when both the front context camera 210A and the front LPR camera 212A are positioned along the forward-facing side 208A.

In some embodiments, the rear context camera 210B can be positioned vertically above or on top of the rear LPR camera 212B. For example, the rear context camera 210B can be positioned vertically above or on top of the rear LPR camera 212B when both the rear context camera 210B and the rear LPR camera 212B are positioned along the rearward-facing side 208B.

As shown in FIGS. 2A and 2B, in one embodiment of the camera hub 100, the camera mounting portion 204 of the camera hub 100 can be shaped substantially as an elongated trapezoidal prism. The elongated trapezoidal prism can comprise a forward-facing angled side (e.g., forward-facing side 208A) and a rearward-facing angled side (e.g., rearward-facing side 208B) when the camera hub 100 is coupled the exterior lateral side 104 of the school bus 102. The front context camera 210A and the front LPR camera 212A can be positioned along the forward-facing angled side. The rear context camera 210B and the rear LPR camera 212B can be positioned along the rearward-facing angled side.

In some embodiments, the front context camera 210A and the front LPR camera 212A can be positioned vertically below the rear context camera 210B and the rear LPR camera 212B. In these embodiments, the front context camera 210A can be positioned vertically below all of the other cameras and the rear LPR camera 212B can be positioned vertically above all of the other cameras.

In alternative embodiments, the front context camera 210A and the front LPR camera 212A can be positioned vertically above the rear context camera 210B and the rear LPR camera 212B. In these embodiments, the front context camera 210A can be positioned vertically above all of the other cameras and the rear LPR camera 212B can be positioned vertically below all of the other cameras.

Figure 2C:
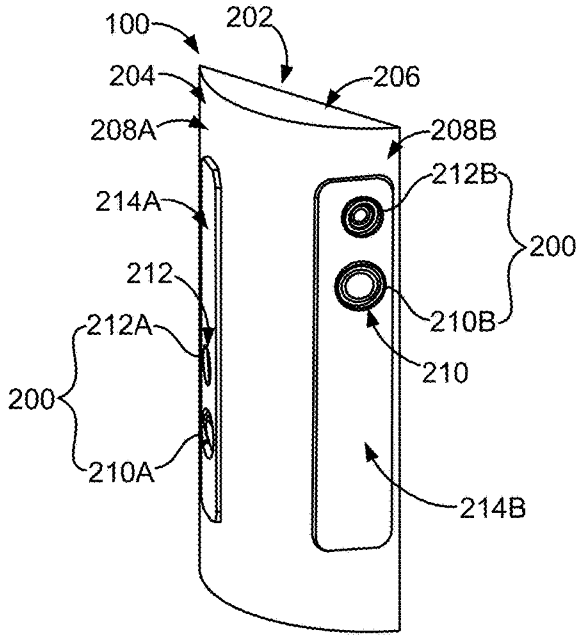
FIG. 2C illustrates a perspective view of another embodiment of the camera hub.

FIG. 2C illustrates a perspective view of another embodiment of the camera hub 100 configured to be coupled to the exterior lateral side 104 of the school bus 102. In this embodiment, the camera mounting portion 204 of the camera hub 100 can be shaped substantially as an elongated semicylinder. The elongated semicylinder can comprise a forward-facing curved side (e.g., forward-facing side 208A) and a rearward-facing curved side (e.g., rearward-facing side 208B) when the camera hub 100 of FIG. 2C is coupled to the exterior lateral side 104 of the school bus 102. The front context camera 210A and the front LPR camera 212A can be positioned along the forward-facing curved side. The rear context camera 210B and the rear LPR camera 212B can be positioned along the rearward-facing curved side.

In alternative embodiments not shown in the figures, the camera mounting portion 204 of the camera hub 100 can be shaped substantially as an elongated cuboid, an elongated triangular prism, or an elongated ovoid or semi-ovoid.

FIGS. 2A-2C illustrate that the camera hub 100 can further comprise a front opaque cover 214A and a rear opaque cover 214B. In some embodiments, the front opaque cover 214A and the rear opaque cover 214B can be made of an opaque polymeric material (e.g., an acrylic material) such as a piece of poly(methyl methacrylate) (PMMA) (e.g., Plexiglass™). In certain embodiments, the front opaque cover 214A can be implemented as a thin strip of opaque plastic (e.g., a rectangular strip of plastic) adhered or otherwise affixed to part of the forward-facing side 208A and the rear opaque cover 214B can be implemented as a thin strip of opaque plastic (e.g., a rectangular strip of plastic) adhered or otherwise affixed to part of the rearward-facing side 208B. For example, the front opaque cover 214A and the rear opaque cover 214B can be implemented as thin strips of black PMMA (e.g., Plexiglass™).

In some embodiments, the front opaque cover 214A can have cutouts or openings that expose the camera lenses of the front context camera 210A and the front LPR camera 212A. In these and other embodiments, the rear opaque cover 214B can have cutouts or openings that expose the camera lenses of the rear context camera 210B and the rear LPR camera 212B.

Figure 2D:
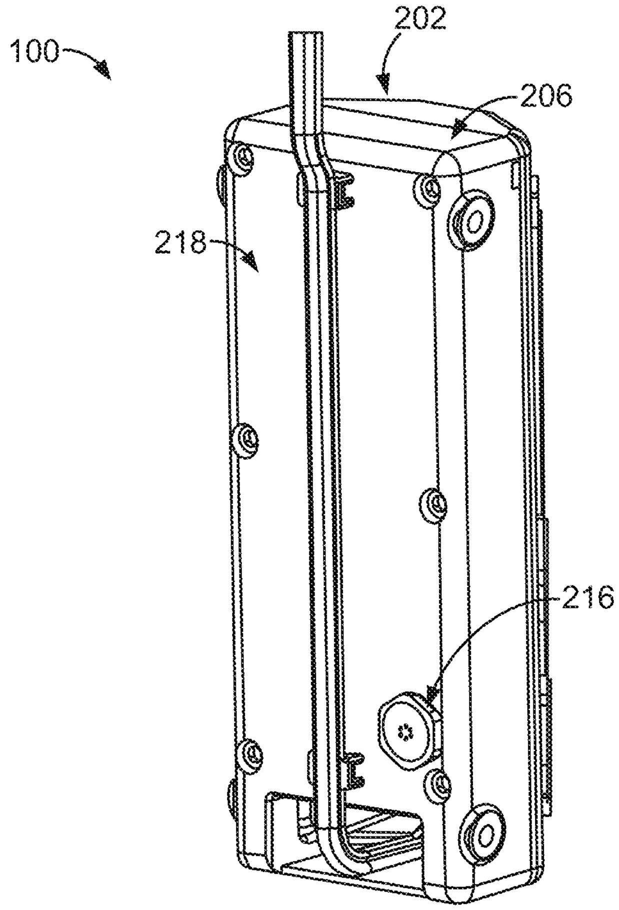
FIG. 2D illustrates a rear view of the camera hub showing a breather vent positioned along a rear side of a camera hub housing of the camera hub.
Figure 2E:
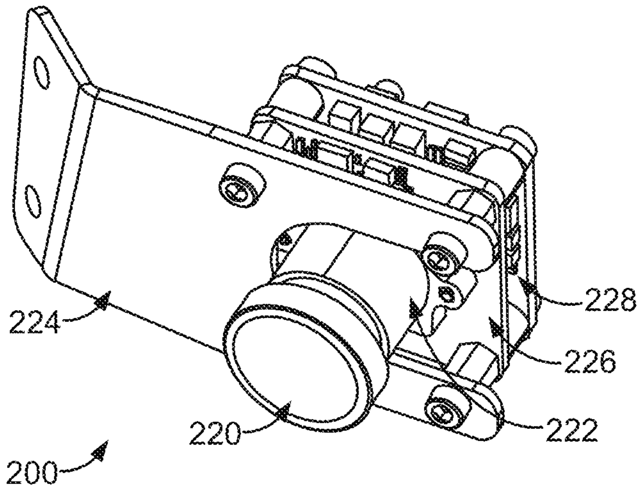
FIG. 2E illustrates a close-up perspective view of one camera of the camera hub.
Figure 2F:
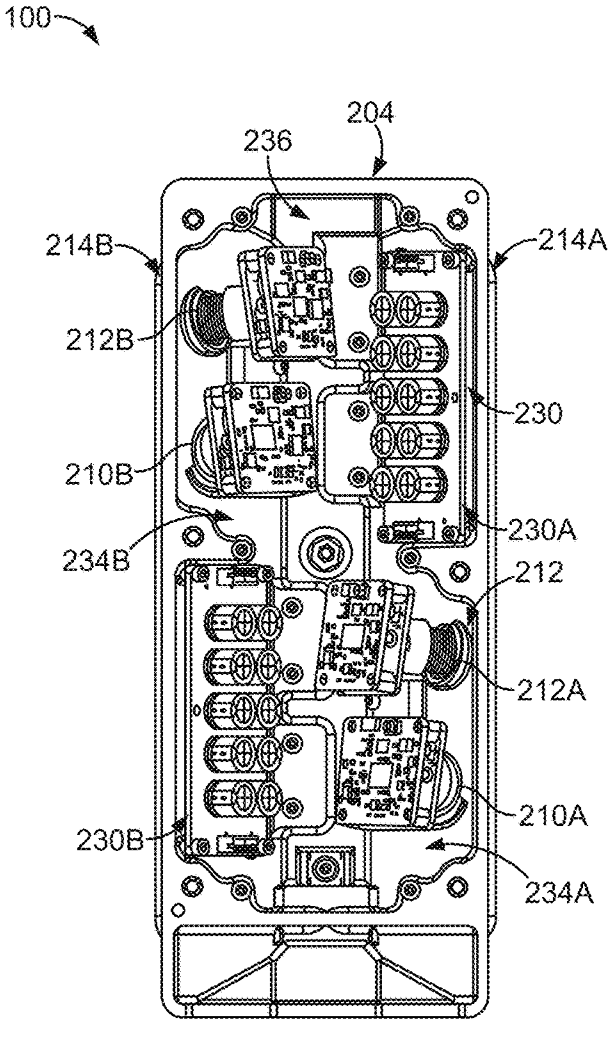
FIG. 2F illustrates a rear view of part of the camera hub with a rear portion removed for ease of viewing.
Figure 2G:
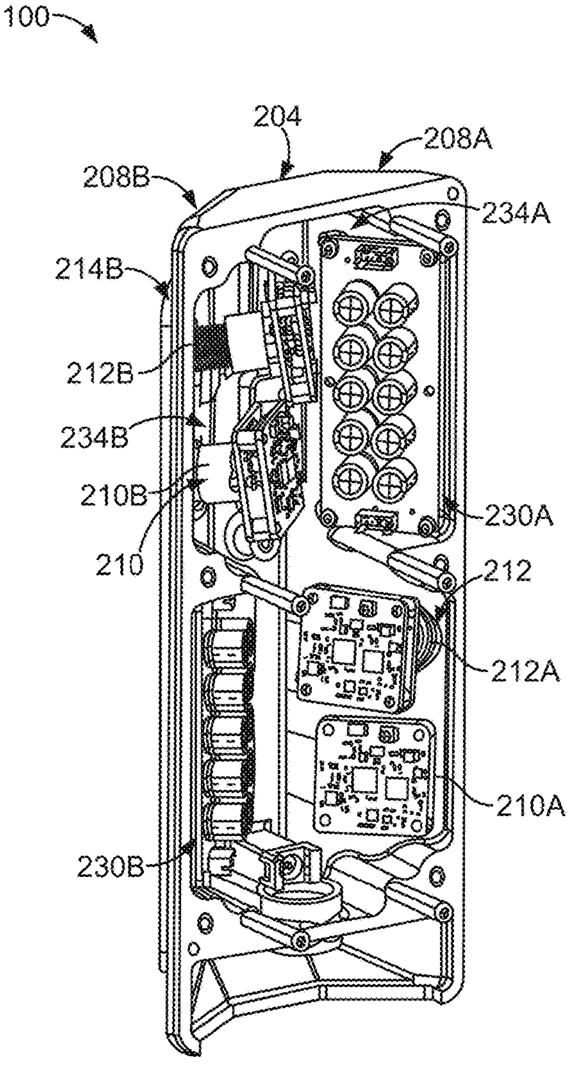
FIG. 2G illustrates a rear perspective view of part of the camera hub with the rear portion removed for ease of viewing.

In certain embodiments, the front opaque cover 214A and the rear opaque cover 214B can act as a cover or shield for a plurality of infrared (IR) lights arranged as an IR light array 230 (see, e.g., FIGS. 2F and 2G). As will be discussed in more detail in relation to FIGS. 2F and 2G, the front opaque cover 214A can cover or shield a front IR light array 230A and the rear opaque cover 214B can cover or shield a rear IR light array 230B.

FIG. 2D illustrates a rear view of the camera hub 100 showing a breather vent 216 positioned along a rear side 218 of the bus attachment portion 206 of the camera hub housing 202 of the camera hub 100. The rear side 218 can be configured to face the exterior lateral side 104 of the school bus 102 when the camera hub 100 is coupled to the exterior lateral side 104. In some embodiments, the breather vent 216 can be located along a lower portion (e.g., a lower right side) or close to the bottom of the rear side 218.

The breather vent 216 can be made in part of a polymeric membrane. In some embodiments, the breather vent 216 can be made of in part of an expanded polytetrafluoroethylene (ePTFE) membrane.

The entire camera hub housing 202 can be sealed except for the breather vent 216. The breather vent 216 can allow the housing pressure within the camera hub 100 to equalize without allowing liquid water or water vapor to pass through.

FIG. 2E illustrates a close-up perspective view of a camera 200 of the camera hub 100. For example, the camera 200 can be one of the context cameras 210 or one of the LPR cameras 212.

The camera 200 can comprise a camera lens 220, a camera lens holder 222, a camera mounting bracket 224, an image sensor or imager printed circuit board (PCB) 226, and an interface PCB 228. The camera 200 can be coupled to the interior of the camera hub housing 202 via the camera mounting bracket 224. The camera mounting bracket 224 can be configured to mount the camera 200 at a specific orientation. For example, the FOVs of the context cameras 210 and the LPR cameras 212 must be aligned to achieve the coverages shown in FIG. 3C.

In some embodiments, one or more of the cameras 200 can be coupled directly to the camera hub housing 202 without the camera mounting bracket 224. In these embodiments, the one or more cameras 200 can be directly threaded into (via a thread connection) or otherwise coupled to a chassis or internal structure within the camera hub housing 202 at a prescribed orientation.

FIGS. 2F and 2G illustrate rear and rear perspective views, respectively, of part of the camera hub 100 (the camera mounting portion 204). The rear portion of the camera hub housing 202 (e.g., the bus attachment portion 206) has been removed in FIGS. 2F and 2G for case of viewing.

FIGS. 2F and 2G illustrate the interior arrangement of certain electronic components within the camera hub 100. In addition to the front context camera 210A, the front LPR camera 212A, the rear context camera 210B, and the rear LPR camera 212B, the camera hub 100 can comprise a plurality of IR light arrays 230. The IR light arrays 230 can comprise a front IR light array 230A and a rear IR light array 230B.

The IR light arrays 230 can be made up of a plurality of IR lights. The IR lights can each emit light in the IR range or NIR range (e.g., between about 780 nm to about 1500 nm). For example, each of the IR lights can be an IR light-emitting diode (LED). The IR light arrays 230 can be synchronized with one or more of the cameras 200 to illuminate offending vehicles and the license plates of such vehicles in low light conditions. IR or NIR wavelengths are useful for license plate recognition since license plates are generally retroreflective and can serve as a bright target that is easier to segment/separate from other scene elements in a video frame.

Figure 2H:
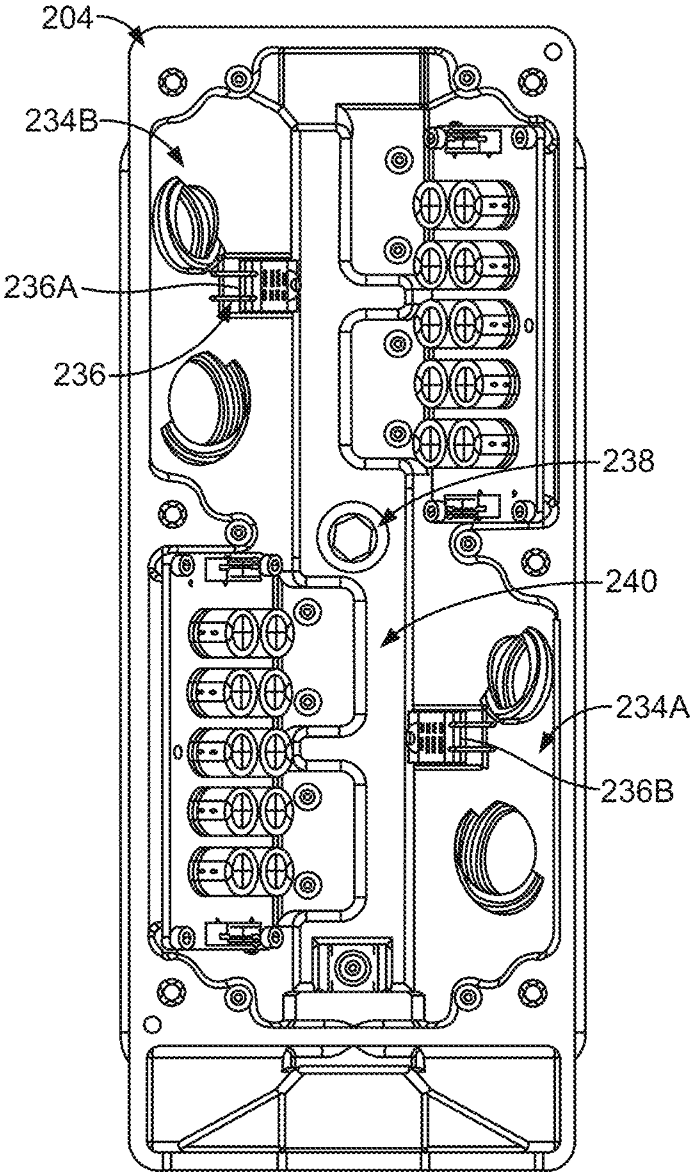
FIG. 2H illustrates a rear view of part of the camera hub with the cameras removed to reveal a number of resistive heaters and a thermistor within the camera hub.

As shown in FIGS. 2F and 2G, the front IR light array 230A and the rear IR light array 230B can each comprise a 2×6 array or matrix of IR lights where two is the number of columns of the array or matrix and six is the number of rows of the array or matrix (what is shown in FIGS. 2F, 2G, and 2H are capacitors on a side opposite the IR lights). Also, as shown in FIGS. 2F and 2G, the front IR light array 230A can be arranged or positioned vertically above or on top of the front context camera 210A and the front LPR camera 212A. In this embodiment, the rear IR light array 230B can be arranged or positioned vertically below or underneath the rear context camera 210B and the rear LPR camera 212B.

In other embodiments, the front IR light array 230A and the rear IR light array 230B can each comprise a 2×3, 2×4, a 2×5, a 3×4, a 3×5, or a 3×6 array or matrix of IR lights. In additional embodiments, the front IR light array 230A and the rear IR light array 230B can each comprise a 1×3, a 1×4, a 1×5, or a 1×6 arrangement of IR lights.

In alternative embodiments, the front IR light array 230A can be arranged or positioned vertically below or underneath the front context camera 210A and the front LPR camera 212A. In these embodiments, the rear IR light array 230B can be arranged or positioned vertically above or on top of the rear context camera 210B and the rear LPR camera 212B.

The front IR light array 230A can be fastened, affixed, or otherwise coupled to an interior forward side 234A of the camera hub housing 202 opposite the forward-facing side 208A. The front IR light array 230A can substantially face the same direction as the camera lenses 220 of the front context camera 210A and/or the front LPR camera 212A.

The rear IR light array 230B can be fastened, affixed, or otherwise coupled to an interior rearward side 234B of the camera hub housing 202 opposite the rearward-facing side 208B. The rear IR light array 230B can substantially face the same direction as the camera lenses 220 of the rear context camera 210B and/or the rear LPR camera 212B.

One technical advantage of the arrangement of cameras 200 and IR lights disclosed herein is that all of the cameras 200 and IR lights needed to capture context videos and LPR videos (in both daytime and low-light conditions) of an offending vehicle committing a school bus stop-arm violation are housed in one singular camera hub housing 202 that can be coupled to a narrow mounting area along an exterior lateral side 104 of the school bus 102 (e.g., along part of a window frame of the school bus 102).

In some embodiments, the one or more context cameras 210 (e.g., the front context camera 210A and the rear context camera 210B) and the LPR cameras 212 (e.g., the front LPR camera 212A and the rear LPR camera 212B) can be RGB-IR cameras (or cameras that operate with a combined RGB-IR image sensor/imager). This allows the context cameras 210 and the LPR cameras 212 to capture videos at visible wavelengths and videos at IR/NIR wavelengths.

The one or more context cameras 210 (e.g., the front context camera 210A and the rear context camera 210B) and the LPR cameras 212 (e.g., the front LPR camera 212A and the rear LPR camera 212B) can also comprise a dual bandpass lens filter that allow wavelengths in the visible spectrum (e.g., about 400 nm to 680 nm) and wavelengths in the NIR/IR spectrum (e.g., centered at about 850 nm or 940 nm) to pass through.

By incorporating cameras 200 with combined RGB-IR image sensors/imagers, the camera hub 100 disclosed herein is able to capture videos in the visible spectrum and the IR spectrum without having to pack separate RGB cameras and IR cameras into a single small-sized camera hub housing 202.

While IR/NIR videos can be useful for the detection of license plates in low light conditions, videos captured at visible wavelengths provide a more familiar depiction of the entire context of the school bus stop-arm violation for a human reviewer for law enforcement purposes and for potential courtroom use. Moreover, videos captured at visible wavelengths and IR/NIR wavelengths can be useful for automated object (e.g., vehicle) detection and object (e.g., vehicle) tracking. As such, IR/NIR videos and RGB videos complement one another when it comes to their usefulness for evidentiary purposes.

Another advantage of the system and methods disclosed herein is that portions of the IR/NIR videos captured by the one or more context cameras 210 can be provided us inputs to an automated license plate recognition (ALPR) deep learning model running on the control unit 116 to automatically recognize a license plate number of an offending vehicle.

As previously discussed, at least part of the forward-facing side 208A can be covered by a front opaque cover 214A and at least part of the rearward-facing side 208B can be covered by a rear opaque cover 214B. The front opaque cover 214A can act as a cover or shield for the front IR light array 230A and the rear opaque cover 214B can act as a cover or shield for the rear IR light array 230B. The front opaque cover 214A and the rear opaque cover 214B can have cutouts or openings defined along the cover to expose the various camera lenses 220. The front opaque cover 214A and the rear opaque cover 214B can be made in part of an opaque polymeric material (e.g., an opaque acrylic material such as an opaque piece of poly(methyl methacrylate) (PMMA) or Plexiglass™) that can act as an IR/NIR band-pass filter.

In some alternative embodiments, one or more of the context cameras 210 can be RGB cameras. In these embodiments, the RGB context camera(s) can capture videos in the visible spectrum.

FIG. 2H illustrates a rear view of part of the camera hub 100 (the camera mounting portion 204) with the plurality of cameras 200 removed to reveal a number of resistive heaters 236 and a thermistor 238 within the camera hub 100. The activation of the resistive heaters 236 and/or the amount of heat generated by the resistive heaters 236 can be controlled by the thermistor 238.

The resistive heaters 236 can be coupled to thermally conductive interior surfaces or thermally conductive chassis surfaces (e.g., metal surfaces or metal chassis surfaces) within the camera hub housing 202 such that heat generated by the resistive heaters 236 heat at least part of the camera lenses 220 (see, e.g., FIG. 2E) of the cameras 200 to prevent snow or frost from accumulating around the camera lenses 220 and obscuring the camera lenses 220. For example, the resistive heaters 236 can be activated when the temperature measured by the thermistor 238 is below around 5° C. or below another temperature threshold.

In some embodiments, the resistive heaters 236 can comprise an upper resistive heater 236A and a lower resistive heater 236B positioned or arranged below or underneath the upper resistive heater 236A. In these embodiments, the thermistor 238 can be positioned in between the upper resistive heater 236A and the lower resistive heater 236B.

At least part of the upper resistive heater 236A can be coupled to the interior rearward side 234B of the camera hub housing 202 opposite the rearward-facing side 208B. At least part of the lower resistive heater 236B can be coupled to the interior forward side 234A of the camera hub housing 202 opposite the forward-facing side 208A.

The thermistor 238 can be coupled to a central interior side 240 of the camera hub housing 202 in between the interior forward side 234A and the interior rearward side 234B.

Table 1 below lists out certain example specifications for the embodiment of the camera hub 100 illustrated in FIGS. 2A-2C and 2F-2G.

TABLE 1

Camera Specifications for Four-Camera Camera Hub

| | LPR Cameras | Context Cameras |
|---|---|---|
| Number of Cameras: | 1 Front LPR Camera<br>1 Rear LPR Camera | 1 Front Context Camera<br>1 Rear Context Camera |
| Lens Field-of-View (FOV) Width: | HFOV 26° (f 2.4) lens | HFOV 95° (f 2.8) lens; total merged view of 180° |
| Lanes monitored for LPR: | 2, 3, and 4 | 1 |
| Lanes monitored for context: | | 1, 2, 3, and 4 |
| Lens filter: | Bandpass (2 zones): visible and IR/NIR (850 nm or 940 nm) | Bandpass (2 zones): visible and IR/NIR (850 nm or 940 nm) |
| Image sensor resolution: | 5 megapixel (MP) | 5 MP |
| Image sensor type: | RGB-IR | RGB-IR |

Tables 2 and 3 below list out certain example specifications for alternative embodiments of the camera hub 100.

TABLE 2

Camera Specifications for Five-Camera Camera Hub (for Monitoring Roadways with 6 Lanes)

| | LPR Cameras | Context Cameras |
|---|---|---|
| Number of Cameras: | 2 Front LPR Cameras<br>2 Rear LPR Cameras | 1 Context Camera |
| Lens Field-of-View (FOV) Width: | Front LPR Camera 1/Rear LPR Camera 1: Narrow, 15°-18°<br>Front LPR Camera 2/Rear LPR Camera 2: Medium, 26°-30° | Very wide (180°) |
| Lanes monitored for LPR: | Front LPR Camera 1/Rear LPR Camera 1: 5 and 6<br>Front LPR Camera 2/Rear LPR Camera 2: 1, 2, 3 and 4 | 1 and/or 2 |
| Lanes monitored for context: | | 1, 2, 3, 4, 5, and 6 |
| Image sensor resolution: | 5 MP or more | 8 MP or more |
| Image sensor type: | RGB-IR | RGB or RGB-IR |

TABLE 3

Camera Specifications for Three-Camera Camera Hub

| | LPR Cameras | Context Cameras |
|---|---|---|
| Number of Cameras: | 1 Front LPR Camera<br>1 Rear LPR Camera | 1 Context Camera |
| Lens Field-of-View (FOV) Width: | Medium, 46°-50° | Very wide, 180° |
| Lanes monitored for LPR: | 2, 3, and 4 | 1 |
| Lanes monitored for context: | | 1, 2, 3, and 4 |
| Lens filter: | Bandpass (2 zones): visible and IR/NIR (850 nm or 940 nm) | Bandpass (2 zones): visible and IR/NIR (850 nm or 940 nm) |
| Image sensor resolution: | 8 MP | 8 MP |
| Image sensor type: | RGB-IR | RGB |

Figure 3A:
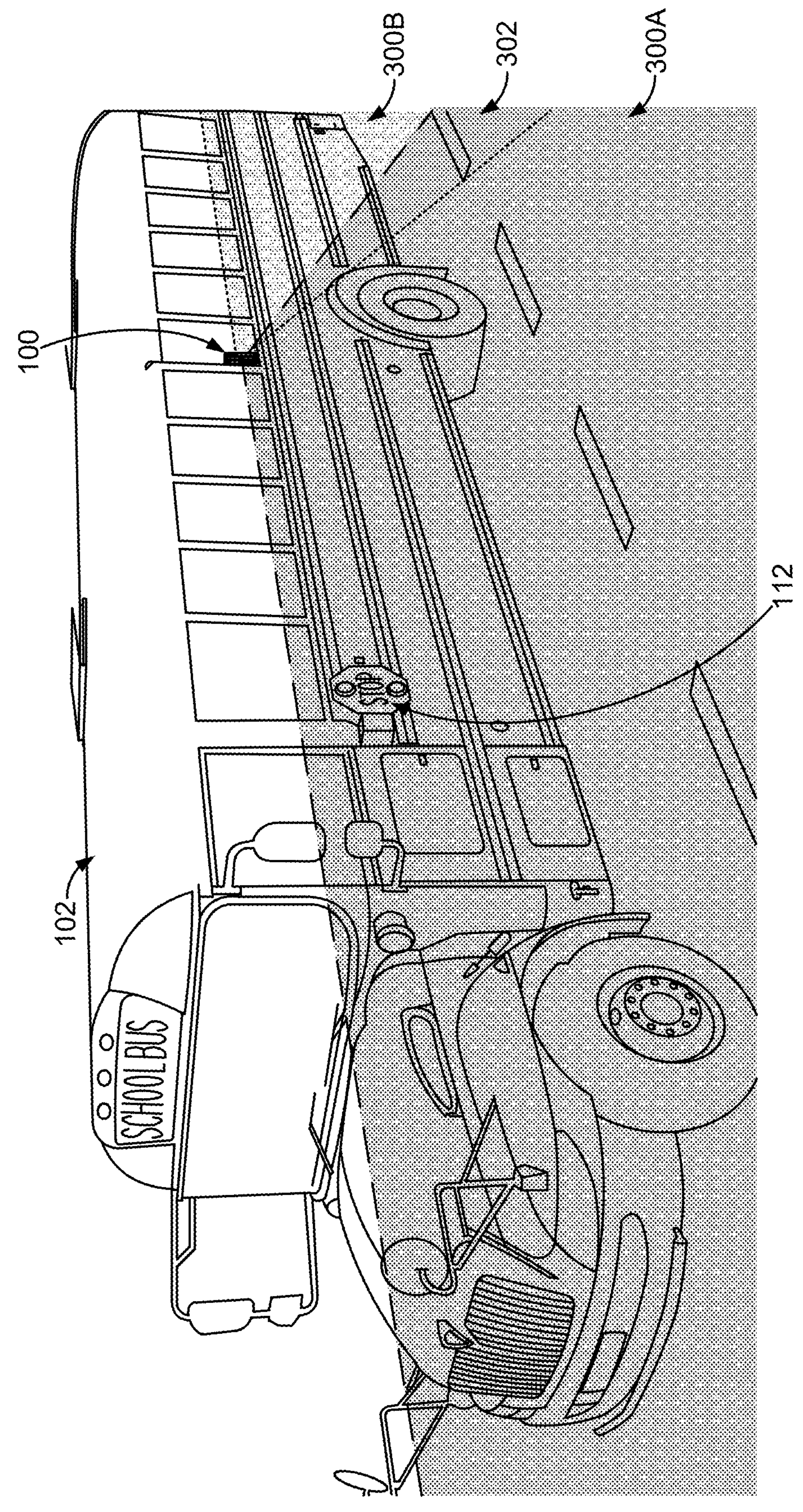
FIG. 3A illustrates a field of view (FOV) of a front context camera and a FOV of a rear context camera.

FIG. 3A illustrates a field of view (FOV) of the front context camera 210A (shown as FOV 300A in FIG. 3A) and a FOV of the rear context camera 210B (shown as FOV 300B in FIG. 3A). The FOV can refer to a horizontal lens FOV.

The FOV of the front context camera 210A and the FOV of the rear context camera 210B can overlap (shown as overlapping FOV region 302 in FIG. 3A). The combined FOVs of the front context camera 210A and the rear context camera 210B can be 180°.

In embodiments where the camera hub 100 comprises two context cameras 210 (e.g., a front context camera 210A and a rear context camera 210B), each of the context cameras 210 can have a FOV of about 95°. The FOV of the front context camera 210A can cover or capture the stop-arm 112 of the school bus 102 when the stop-arm 112 is articulated or fully-extended.

In certain embodiments, the school bus 102 can comprise two stop-arms 112 (e.g., a front stop-arm and a rear stop-arm). In these embodiments, the FOV of the rear context camera 210B can cover or capture the rear stop-arm when the rear stop-arm is articulated or fully-extended.

The combined 180° FOV of the context cameras 210 can allow the context cameras 210 to capture videos that show the full context or the entire event scene around the school bus 102. These videos can capture all vehicles and vehicle movements surrounding the school bus 102 and snippets or portions of such videos can be used as proof when one or more of these vehicles commits a school bus stop-arm violation by passing the school bus 102 when the school bus 102 is stopped and at least one stop-arm 112 of the school bus 102 is extended with one or more lights 114 on the stop-arm 112 flashing red. The combined 180° FOV of the context cameras 210 can allow the context cameras 210 to capture the articulated or fully-extended stop-arm 112 of the school bus 102 in certain video frames of the video(s) along with the offending vehicle in the process of committing the school bus stop-arm violation.

In some embodiments, the combined 180° FOV of the context cameras 210 can cover or capture vehicle activity in up to four lanes (where lanes can include vehicle traffic in either direction relative to a heading direction of the school bus 102). In these embodiments, the context cameras 210 can monitor vehicle activity in up to four lanes (including oncoming-traffic lanes) for vehicles committing school bus stop-arm violations by either approaching the stopped school bus 102 from the front or passing from the rear.

In alternative embodiments, the camera hub 100 can comprise one context camera 210. In these embodiments, the FOV of the singular context camera 210 can be 180°. The 180° FOV of the context camera 210 can allow the context camera 210 to capture the articulated or fully-extended stop-arm 112 of the school bus 102 in certain video frames of the video(s) captured by the context camera 210. The articulated or fully-extended stop-arm 112 can be captured along with the offending vehicle in the process of committing the school bus stop-arm violation. The 180° FOV of the one context camera 210 can cover or capture vehicle activity in up to six lanes (where lanes can include vehicle traffic in either direction relative to a heading direction of the school bus 102). In these embodiments, the context cameras 210 can monitor vehicle activity in up to six lanes (including oncoming-traffic lanes) for vehicles committing school bus stop-arm violations by either approaching the stopped school bus 102 from the front or passing from the rear.

In some embodiments, the context camera(s) 210 of the camera hub 100 can capture video at a frame rate of between 20 frames per second (FPS) and 30 FPS (e.g., about 25 FPS). In other embodiments, the context camera(s) 210 of the camera hub 100 can capture video at a frame rate of above 30 FPS (e.g., between about 30 FPS and 50 FPS).

In certain embodiments, the image sensor of each of the context cameras 210 can be CMOS image sensors with an image sensor resolution of between 5 megapixels (MP) and 8 MP. In other embodiments, the image sensor of each of the context cameras 210 can be CMOS image sensors with an image sensor resolution of greater than 8 MP (e.g., between about 8 MP and 50 MP).

As previously discussed, in some embodiments, the context camera(s) 210 can comprise RGB-IR image sensors that allow the context camera(s) 210 to capture videos and images at visible wavelengths and IR/NIR wavelengths.

In alternative embodiments, the context camera 210 (or one of the context cameras 210 when the camera hub 100 comprises multiple context cameras 210) can comprise an RGB image sensor.

Figure 3B:
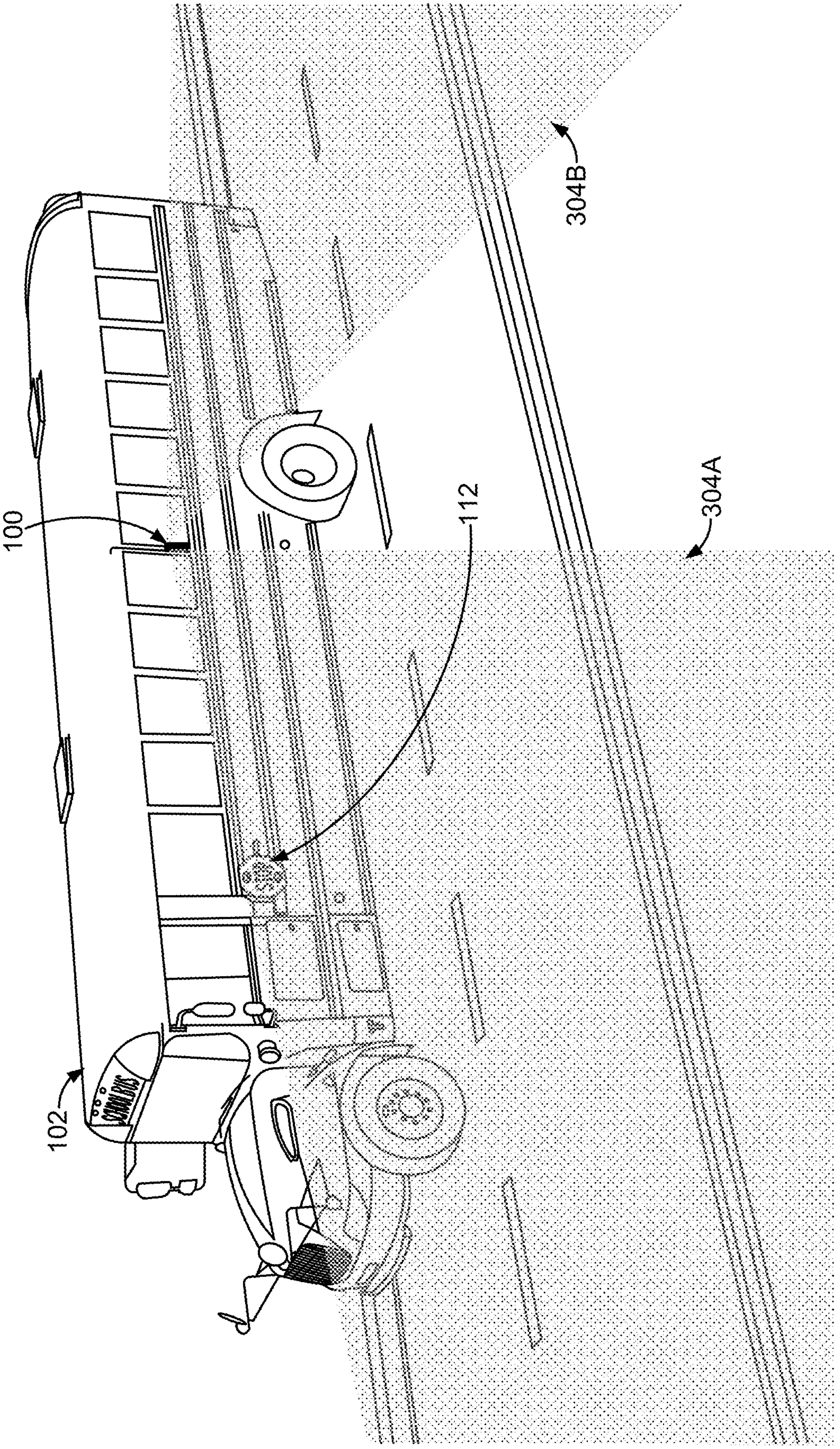
FIG. 3B illustrates a FOV of a front LPR camera and a rear LPR camera.

FIG. 3B illustrates a FOV of the front LPR camera 212A (shown as FOV 304A in FIG. 3B) and a FOV of the rear LPR camera 212B (shown as FOV 304B in FIG. 3B). The FOV can refer to a horizontal lens FOV.

Each of the LPR cameras 212 can have a FOV of between about 15° and 50°. The LPR cameras 212 can have a narrower FOV than the context cameras 210 because the resolution required of LPR cameras 212 is higher. As shown in FIG. 3B, the FOV of the front LPR camera 212A does not overlap with the FOV of the rear LPR camera 212B.

In embodiments where the camera hub 100 comprises two LPR cameras 212 (e.g., a front LPR camera 212A and a rear LPR camera 212B), each of the LPR cameras 212 can have a FOV of between about 26° and 50° (e.g., about 26° or between about 46°-50°). As shown in FIG. 3B, the FOV of the front LPR camera 212A can cover or capture the stop-arm 112 of the school bus 102 when the stop-arm 112 is articulated or fully-extended. In certain embodiments, the school bus 102 can comprise two stop-arms 112 (e.g., a front stop-arm and a rear stop-arm). In these embodiments, the FOV of the rear LPR camera 212B can cover or capture the rear stop-arm when the rear stop-arm is articulated or fully-extended.

In embodiments where the camera hub 100 comprises two LPR cameras 212 (e.g., two front LPR cameras and two rear LPR cameras), one set of LPR cameras can have a FOV between about 15°-18° and another set of LPR cameras can have a FOV between about 26°-30°.

As will be discussed in more detail in later sections, the LPR cameras 212 can capture videos or images of an offending vehicle that can then be provided as inputs to an automated license plate recognition (ALPR) deep learning model running on the control unit 116. The ALPR deep learning model can automatically recognize a license plate number 136 of the license plate 138 of an offending vehicle from video frames of the videos or images (by automatically detecting the license plate 138 of the offending vehicle and then automatically recognizing the alphanumeric characters making up the license plate number 136).

In some embodiments, the LPR cameras 212 of the camera hub 100 can capture video at a frame rate of between 20 frames per second (FPS) and 30 FPS (e.g., about 25 FPS). In other embodiments, the LPR cameras 212 of the camera hub 100 can capture video at a frame rate of above 30 FPS (e.g., between about 30 FPS and 50 FPS).

In certain embodiments, the image sensor of each of the LPR cameras 212 can be CMOS image sensors with an image sensor resolution of between 5 megapixels (MP) and 8 MP. In other embodiments, the image sensor of each of the LPR cameras 212 can be CMOS image sensors with an image sensor resolution of greater than 8 MP (e.g., between about 8 MP and 50 MP).

As previously discussed, in some embodiments, the LPR cameras 212 can comprise RGB-IR image sensors that allow the LPR cameras 212 to capture videos and images at visible wavelengths and IR/NIR wavelengths.

Figure 3C:
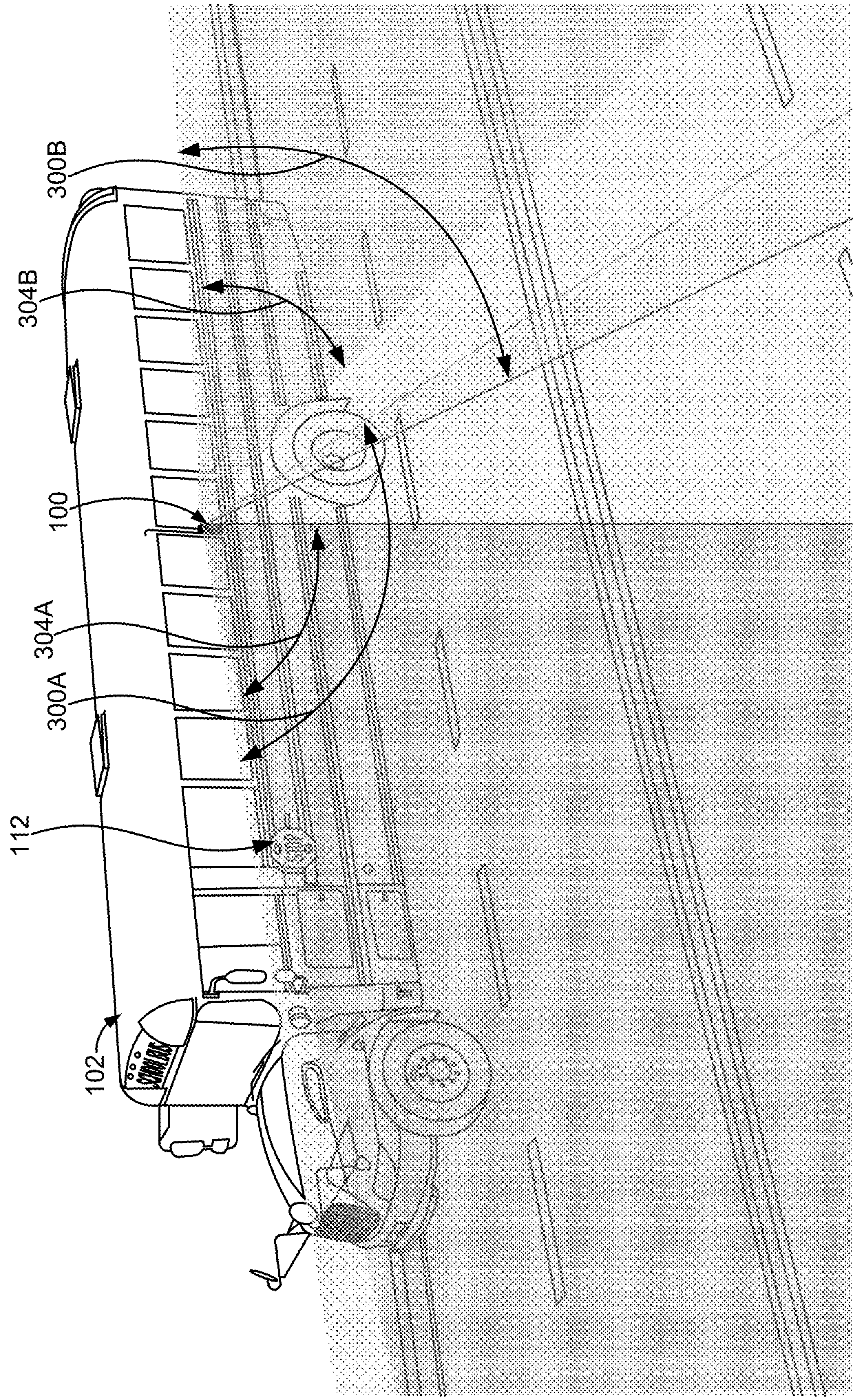
FIG. 3C illustrates the FOVs of the front context camera, the rear context camera, the front LPR camera, and the rear LPR camera.

FIG. 3C illustrates the FOVs of the front context camera 210A, the rear context camera 210B, the front LPR camera 212A, and the rear LPR camera 212B of the camera hub 100. The FOVs of the front context camera 210A and the rear context camera 210B can overlap with one another. In addition, the FOV of the front context camera 210A (shown as FOV 300A) can overlap with the FOV of the front LPR camera 212A (shown as FOV 304A). Furthermore, the FOV of the rear context camera 210B (shown as FOV 300B) can overlap with the FOV of the rear LPR camera 212B (shown as FOV 304B). The overlap in the FOVs can allow multiple cameras 200 to act as back-ups in case videos and/or images captured by one camera 200 are not of sufficient quality to be used for automated license plate recognition.

As previously discussed, the placement of the camera hub 100 along the exterior lateral side 104 and on part of the window frame 146 of the school bus 102 and the arrangement of the cameras 200 within the camera hub 100 can allow the context cameras 210 to capture videos and/or images of offending vehicle(s) in all lanes. For example, these lanes can comprise any one or all of Lanes 1-4. The lane immediately adjacent to or closest to the lane occupied by the school bus 102 can be referred to as Lane 1. Lane 2 can be the lane immediately adjacent to or next to Lane 1 that is not the lane occupied by the school bus 102 (for example, Lane 2 can be the lane to the left of Lane 1). Lane 3 can be the lane next to Lane 2 that is not Lane 1 (for example, Lane 3 can be the lane to the left of Lane 2). Lane 4 can be the lane next to Lane 3 that is not Lane 2 (for example, Lane 4 can be the lane to the left of Lane 3).

Video frames or images captured by the context cameras 210 of offending vehicles in Lanes 1-4 can be used as inputs to a vehicle detection deep learning model 508 and a vehicle tracker 510 (see, e.g., FIG. 5) running on the control unit 116.

In some embodiments, video frames or images captured by the context cameras 210 of offending vehicles in Lane 1 can be used as inputs to an ALPR deep learning model 420 (see, e.g., FIG. 4) running on the control unit 116 to automatically recognize the license plate number 136 of the license plate 138 of the offending vehicle.

In addition, the placement of the camera hub 100 along the exterior lateral side 104 and on part of the window frame 146 of the school bus 102 and the arrangement of the cameras 200 within the camera hub 100 can allow the LPR cameras 212 to capture videos and/or images of offending vehicle(s) in Lanes 2-4.

In other embodiments, such as in embodiments where the camera hub 100 comprises five cameras (e.g., two front and two rear LPR cameras 212 and one context camera 210), the singular context camera 210 can capture videos and/or images of an offending vehicle in Lanes 1 and/or 2 and video frames form such videos and/or images can be provided as inputs to the ALPR deep learning model 420 running on the control unit 116 to automatically recognize the license plate number 136 of the license plate 138 of the offending vehicle. Moreover, the first set of front and rear LPR cameras can capture videos and/or images of an offending vehicle in Lanes 5 and 6 and video frames from such videos and/or the images can be provided as inputs to the ALPR deep learning model 420 running on the control unit 116 to automatically recognize the license plate number 136 of the license plate 138 of the offending vehicle. Furthermore, the second set of front and rear LPR cameras can capture videos and/or images of an offending vehicle in Lanes 1, 2, 3, and 4 and video frames from such videos and/or the images can be provided as inputs to the ALPR deep learning model 420 running on the control unit 116 to automatically recognize the license plate number 136 of the license plate 138 of the offending vehicle.

In further embodiments, such as in embodiments where the camera hub 100 comprises three cameras (e.g., one front LPR and one rear LPR camera 212 and one context camera 210), the singular context camera 210 can capture videos and/or images of an offending vehicle in Lane 1. Video frames or images captured by this context camera 210 can be provided as inputs to the ALPR deep learning model 420 running on the control unit 116 to automatically recognize the license plate number 136 of the license plate 138 of the offending vehicle. Moreover, the front and rear LPR cameras 212 can capture videos and/or images of an offending vehicle in Lanes 2, 3, and 4 and video frames from such videos and/or the images can be provided as inputs to the ALPR deep learning model 420 running on the control unit 116 to automatically recognize the license plate number 136 of the license plate 138 of the offending vehicle.

One technical advantage of the camera hub 100 disclosed herein is that all of the cameras 200 within the camera hub 100 can capture videos and/or images that can be provided as inputs to the ALPR deep learning model 420 running on the control unit 116 to automatically recognize the license plate number 136 of the license plate 138 of the offending vehicle. These include videos and/or images captured by one or more context cameras 210 with a wider angle FOV and LPR cameras 212 with a narrower FOV.

Figure 4:
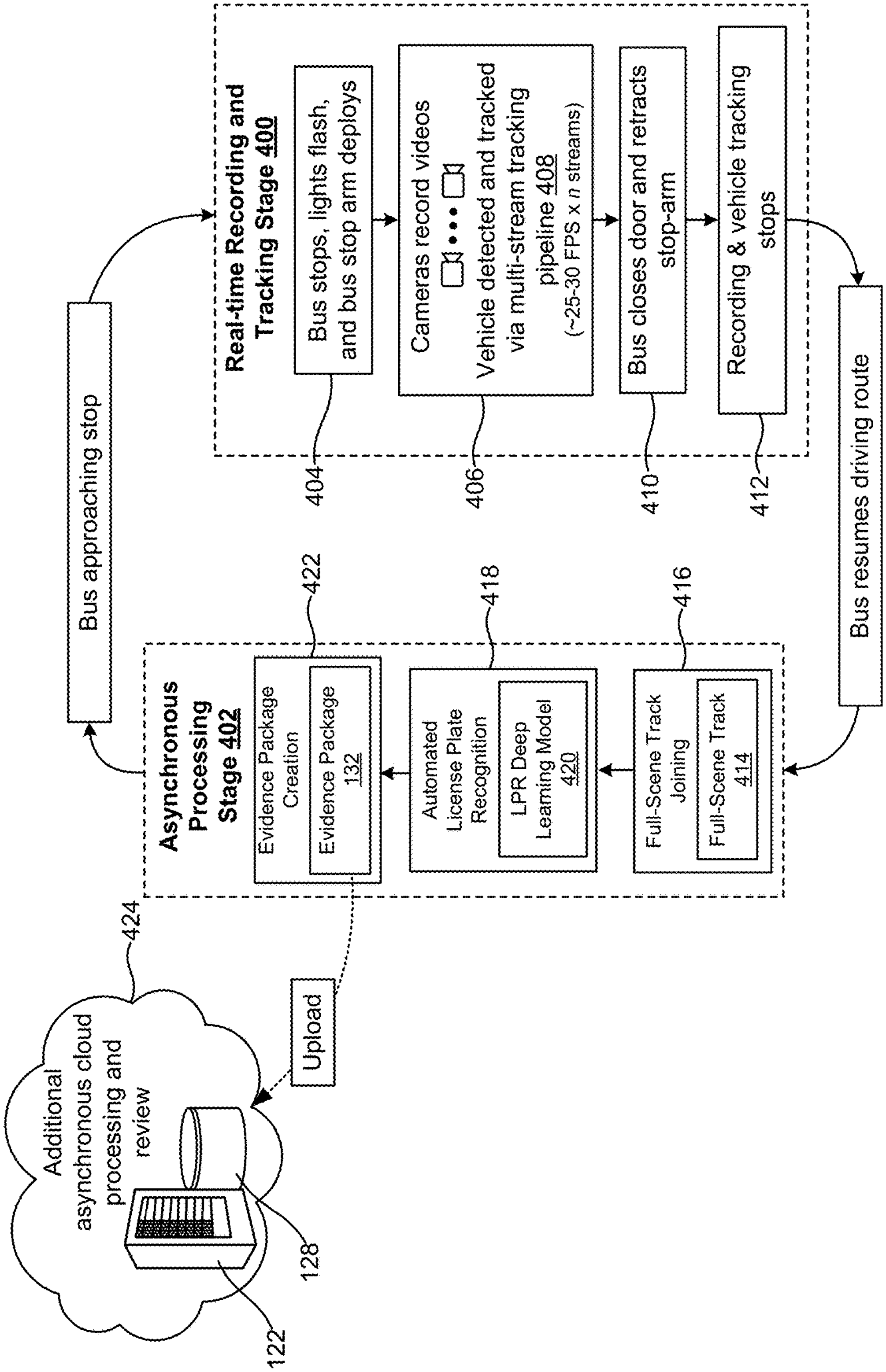
FIG. 4 illustrates example steps of a real-time recording and tracking stage after the school bus is stopped and example steps of an asynchronous processing stage after the school bus resumes driving.

FIG. 4 illustrates example steps of a real-time recording and tracking stage 400 after the school bus 102 is stopped and example steps of an asynchronous processing stage 402 after the school bus 102 resumes driving. The real-time recording and tracking stage 400 can begin when the school bus 102 is fully stopped and the one or more stop-arms 112 of the school bus 102 are deployed or extended with the one or more lights 114 on the stop-arm(s) 112 flashing (e.g., flashing red lights) or blinking to signal that the school bus 102 is stopped and about to unload passengers (e.g., students) in step 404. In some embodiments, the control unit 116 can interface with a bus control system (e.g., via a sense wire) to receive the stop-arm deployment status, flashing light status, and a current speed of the school bus 102.

This data and status information can trigger the cameras 200 of the camera hub 100 to begin capturing videos and/or images of an external environment surrounding the school bus 102 in step 406. For example, the cameras 200 (e.g., the front context camera 210A, the rear context camera 210B, the front LPR camera 212A, and the rear LPR camera 212B) can begin to capture videos and/or images of the surrounding lanes (e.g., Lanes 1, 2, 3, and 4) of the roadway occupied by the school bus 102.

Step 406 can also comprise detecting and tracking an offending vehicle via a multi-stream tracking pipeline 408. The multi-stream tracking pipeline 408 will be discussed in more detail in relation to FIG. 5. The control unit 116 can use a plurality of deep learning models to detect and track offending vehicles in real-time from videos captured by the plurality of cameras 200 as part of the multi-stream tracking pipeline 408.

The end of the real-time recording and tracking stage 400 can commence as the school bus 102 closes its door and retracts its stop-arm 112 in step 410. At this point, the control unit 116 can stop vehicle detection and tracking the offending vehicle and the cameras 200 of the camera hub 100 can stop recording in step 412.

Once the school bus 102 resumes its driving route, the control unit 116 can undertake certain steps or operations as part of an asynchronous processing stage 402. These steps or operations can be run in batch mode in between school bus stops (i.e., the control unit 116 can undertake these steps or operations while the school bus 102 is driving).

The asynchronous processing stage 402 can comprise generating a full-scene track 414 of the offending vehicle in step 416. The full-scene track 414 can be generated based on a plurality of tracklets 512 generated as part of the real-time recording and tracking stage 400. Generating the tracklets 512 will be discussed in more detail in the following sections.

The full-scene track 414 can refer to a collection of data, information, and/or files corresponding to the movement of the offending vehicle as the offending vehicle enters the FOV of one of the cameras 200 of the camera hub 100, passes the school bus 102 while the school bus 102 is stopped with the stop-arm(s) 112 of the school bus 102 deployed, and exits the FOVs of the cameras 200 after passing the stopped school bus 102.

In some embodiments, the full-scene track 414 can be a dataset comprising image coordinates or tracked points of the detected offending vehicle and image coordinates of the license plate 138 of the offending vehicle obtained from various images and video frames captured by the plurality of cameras 200 of the camera hub 100 across different camera views. These include videos and images captured by the context cameras 210 (including videos and images captured in the visible spectrum and the IR/NIR spectrum) and the LPR cameras 212 (including videos and images captured in the visible spectrum and the IR/NIR spectrum). In certain embodiments, the full-scene track 414 can also comprise estimated GPS coordinates of the offending vehicle.

The full-scene track 414 can be generated or joined together from the tracklets 512 stored in a memory or storage device on the control unit 116 or a memory or storage device accessible to the control unit 116. Image coordinates from at least one of the tracklets 512 can be associated with image coordinates from one or more of the other tracklets 512 in order to generate the full-scene track 414.

In some embodiments, image coordinates from at least one of the tracklets 512 can be associated with image coordinates from one or more of the other tracklets 512 using a homography transform algorithm. For example, the homography transform algorithm can be a four-point homography transform algorithm which requires (at least) four corresponding points on a plane in the world and their locations as detected in both camera views. In other embodiments, the homography transform algorithm can be any of the homography transform algorithms discussed in Hartley, Richard, and Andrew Zisserman. Multiple view geometry in computer vision. Cambridge university press, 2003, the content of which is incorporated herein by reference in its entirety.

The computed homographies can be used to associate image coordinates or tracked points from one camera sequence to another. For example, image coordinates from one camera view (e.g., a wide-angle context camera FOV) can be transformed into a corresponding location in another camera view (e.g., a narrower LPR camera FOV) using the homography transform algorithm.

The homography between camera views can be computed or otherwise determined during an initial calibration stage (e.g., using a planar target) and then the computed homography can be used to associate or map image points from one camera view to the other camera view.

In some cases, a vehicle tracker for one of the LPR cameras 212 can fail to track the offending vehicle. In these cases, a stored tracklet 512 from one of the context cameras 210 where the FOV of the context camera 210 overlaps with the FOV of the LPR camera 212 with the failed tracker can be used to approximate the location of the offending vehicle in the video frames captured by the LPR camera 212. By doing so, the video frames captured by the LPR camera 212 can still be used for automated license plate recognition despite the control unit 116 not being triggered to do so by the lack of a vehicle track for that particular LPR camera 212.

The asynchronous processing stage 402 can further comprise conducting automated license plate recognition on certain portions or segments of the videos captured by the various cameras 200 in step 418. These portions or segments of the videos can be determined or selected based on the full-scene track 414. For example, those portions or segments of video(s) showing the offending vehicle moving through the FOV of a camera 200 can be provided as inputs to an automated license plate recognition (ALPR) deep learning model 420 running on the control unit 116. By relying on the full-scene track 414, only those portions or segments of a video showing the offending vehicle moving through the FOV of a camera 200 can be provided as inputs without having to process the entire video.

In some embodiments, the ALPR deep learning model 420 running on the control unit 116 can be a neural network trained for license plate recognition. In certain embodiments, the ALPR deep learning model 420 can be a modified version of the OpenALPR™ license plate recognition model. In other embodiments, the ALPR deep learning model 420 can be a vision transformer. For example, the ALPR deep learning model 420 can be the vision transformer (e.g., a text-adapted vision transformer) disclosed in U.S. Pat. No. 11,915,499, the content of which is incorporated herein by reference in its entirety.

The automated license plate recognition procedure can further comprise obtaining a prediction from the ALPR deep learning model 420 for each video frame concerning a license plate number of the offending vehicle shown in the video frame. The ALPR deep learning model 420 can also output a confidence value (e.g., a decimal value between 0 and 1.0 or a percentage value between 0 and 100%) associated with the prediction. All of the predictions and confidence values can be aggregated and one predicted license plate number can be selected as the likely license plate number 136 of the offending vehicle based on the confidence values or the frequency of the predicted license plate numbers. As a more specific example, one or more thresholds can be set to evaluate the confidence values and/or the frequency of the predicted license plate numbers and those predicted license plate numbers with confidence values and/or frequencies that do not meet such thresholds can be eliminated as part of the selection process until only one license plate number 136 remains.

The asynchronous processing stage 402 can also comprise generating an evidence package 132 to be uploaded to the server 122 in step 422. The contents of the evidence package 132 can be further processed and analyzed by the server 122.

In some embodiments, the evidence package 132 can comprise the license plate number 136 of the offending vehicle obtained from the automated license plate recognition procedure. The evidence package 132 can also comprise portions, snippets, or video frame images of videos 134 captured by the cameras 200 of the camera hub 100 showing the offending vehicle committing a school bus stop-arm violation. In certain embodiments, the evidence package 132 can also comprise a composite video generated from the portions or snippets of videos 134 captured by the cameras 200 of the camera hub 100 showing the offending vehicle committing the school bus stop-arm violation (referred to herein as an offending vehicle). The evidence package 132 can further comprise the location 140 of the offending vehicle as determined or estimated from positioning data obtained from the communication and positioning unit 118 of the control unit 116, any timestamps 142 recorded by the control unit 116 at the time that the offending vehicle was detected, any timestamps 142 associated with the deployment of the stop-arm 112 and activation of the lights 114 on the stop-arm 112, and one or more vehicle attributes 144 of the offending vehicle automatically detected by the control unit 116 from the videos 134 captured by the one or more cameras 200.

The evidence package 132 can be uploaded or otherwise transmitted to the server 122 via a secure connection 126 (see, e.g., FIG. 1A) such as a secured LTE, 4G, or 5G connection. In other embodiments, the evidence package 132 can be uploaded or otherwise transmitted to the server 122 via Wi-Fi.

After the evidence package 132 is uploaded, the contents of the evidence package 132 can be stored and further processed in step 424. For example, the contents of the evidence package 132 can be stored in the cloud database 128 (e.g., in a relational database management system (RDBMS)). The server 122 can undertake additional image processing and refinement of the videos or snippets of videos received as part of the evidence package 132. For example, the server 122 can conduct histogram equalization and sharpness filtering on video frames from such videos. The server 122 can also have more robust or more complicated deep learning models (e.g., more robust object detection deep learning model(s), more robust vehicle/object tracker(s), and/or more robust ALPR deep learning model(s)) running on the server 122 or in the cloud. The video frames from the evidence package 132 can be provided as inputs to these more robust or more complicated deep learning models to detect and remove false positive results and to improve the accuracy of these deep learning models or deep learning models run on the control unit 116.

The various processes and software steps disclosed and depicted herein can communicate with one another using a messaging protocol (for message queuing/brokering) such as the MQTT protocol.

Figure 5:
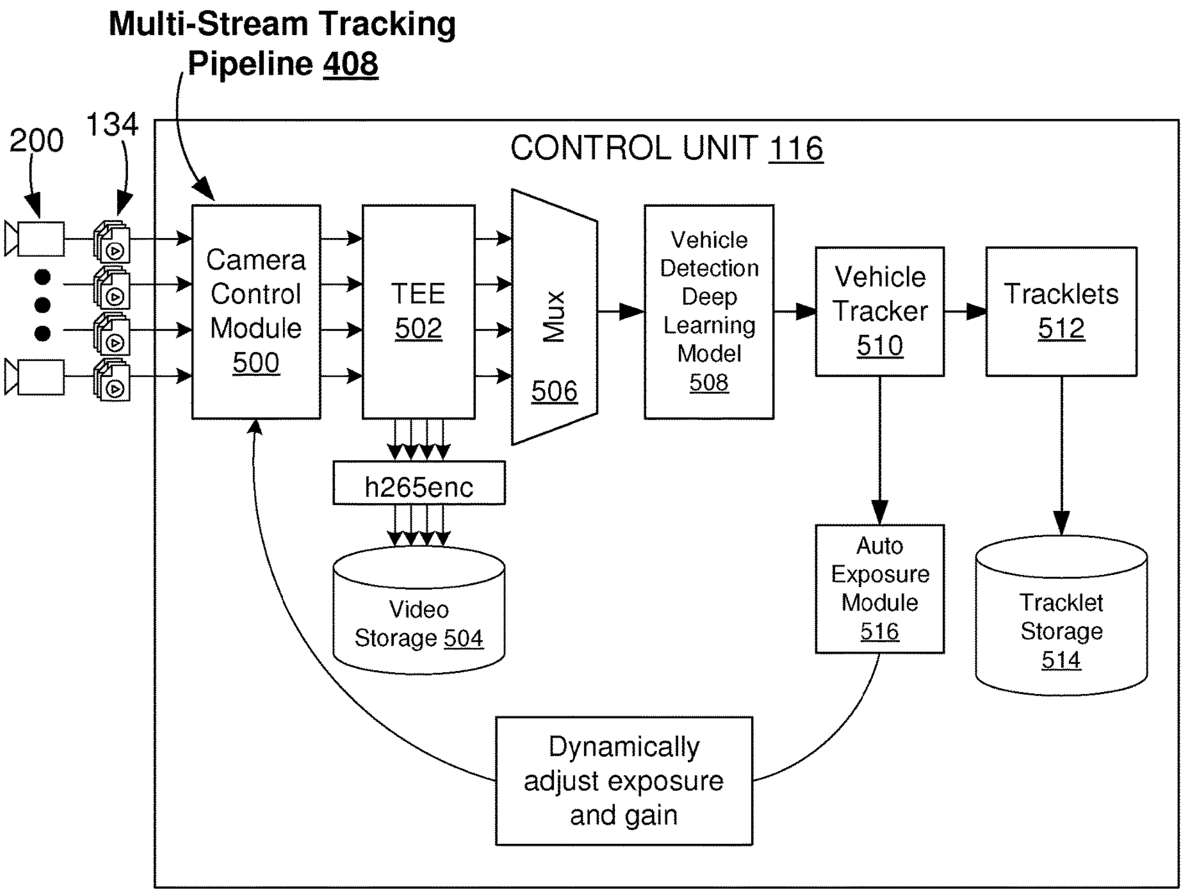
FIG. 5 illustrates certain software and hardware modules of a control unit communicatively coupled to the camera hub.

FIG. 5 illustrates certain software and hardware modules of the control unit 116 that comprise part of the multi-stream tracking pipeline 408 (see, e.g., FIG. 4). As shown in FIG. 5, the control unit 116 can comprise a camera control module 500 configured to retrieve or grab video frames of videos captured by the cameras 200 from a shared camera memory, a trusted execution environment (TEE) 502 (e.g., a TEE on a GPU or CPU), a video storage 504 for storing encoded video files, a multiplexer 506 configured to receive multiple encoded video files and select video frames to provide as inputs to a downstream deep learning model, a vehicle detection deep learning model 508 (also referred to as a vehicle detector) configured to automatically detect vehicles from the video frames, and a vehicle tracker 510 configured to track an offending vehicle across multiple video frames to produce tracklets 512 that can be stored in a tracklet storage 514. The control unit 116 can also run an auto exposure algorithm 516 for dynamically adjusting an exposure and gain of one of the video frames.

As previously discussed, the multi-stream tracking pipeline 408 can be part of the real-time recording and tracking stage 400 that is in operation while the school bus 102 is stopped and the stop-arm 112 is deployed with one or more lights 114 flashing red.

In some embodiments, the multi-stream tracking pipeline 408 can be a GStreamer pipeline with GStreamer plugins that can detect and track vehicles in real-time from a plurality of video streams (e.g., where each video stream is captured at between about 20 FPS and 30 FPS) captured while the school bus 102 is stopped.

The multi-stream tracking pipeline 408 can grab video frames from the videos captured by the plurality of cameras 200, generate encoded video files from the raw videos, store the encoded video files in the video storage 504, pass the encoded video files as inputs to the multiplexer 506, detect vehicles from the video frames using the vehicle detection deep learning model 508, track the vehicles using the vehicle tracker 510, and generate tracklets 512 that can then be used to eventually generate full-scene tracks 414 of the vehicles. Vehicles from the video frames can be detected and tracked using batched GPU inference.

In some embodiments, the vehicle detection deep learning model 508 can be a convolutional neural network trained for object detection. For example, the vehicle detection deep learning model 508 can be a convolutional neural network trained for detecting vehicles.

As a more specific example, the vehicle detection deep learning model 508 can be a modified version of the You Only Look Once (YOLO) objection detection model such as a modified version of the YOLO-9 model.

In other embodiments, the vehicle detection deep learning model 508 can be a deep learning model that is encapsulated in an NVIDIA gst-nvinfer DeepStream node. In these embodiments, the vehicle detection deep learning model 508 can be a multi-headed convolutional neural network comprising a residual neural network backbone (e.g., the ResNet-10 model).

The vehicle detection deep learning model 508 can bound the detected vehicle in a vehicle bounding polygon. The vehicle detection deep learning model 508 can output a series of vehicle bounding polygons (including image coordinates of the vehicle bounding polygons). The vehicle bounding polygons (including the image coordinates of the vehicle bounding polygons) can be provided as inputs to the vehicle tracker 510.

In some embodiments, the vehicle tracker 510 can consume vehicle detections (e.g., vehicle bounding polygons including the image coordinates of the vehicle bounding polygons) from the upstream vehicle detection deep learning model 508 and output tracks of the detected vehicles. The tracks can be a sequence of image coordinates of the vehicle bounding polygons across multiple video frames. Each of these tracks can be referred to as a tracklet 512 when the video frames are part of a video captured by a singular camera 200. The tracklets 512 can be stored sequentially in a local file system on the control unit 116 such as the tracklet storage 514. The tracklets 512 can be used to eventually generate a full-scene track 414 of an offending vehicle during the asynchronous processing stage 402 (see, e.g., FIG. 4). As previously discussed, the full-scene track 414 can include image coordinates of the vehicle across a plurality of tracklets 512 (generated from videos captured by the plurality of cameras 200). Since the cameras 200 have differing camera FOVs, a homography transform algorithm can be used to correspond image coordinates of the same vehicle across multiple tracklets 512.

As will be discussed in more detail in the following section, the control unit 116 can also run an auto exposure algorithm 516 to dynamically adjust an exposure and gain of one or more video frames to optimize the video frame for automated license plate recognition.

Figure 6:
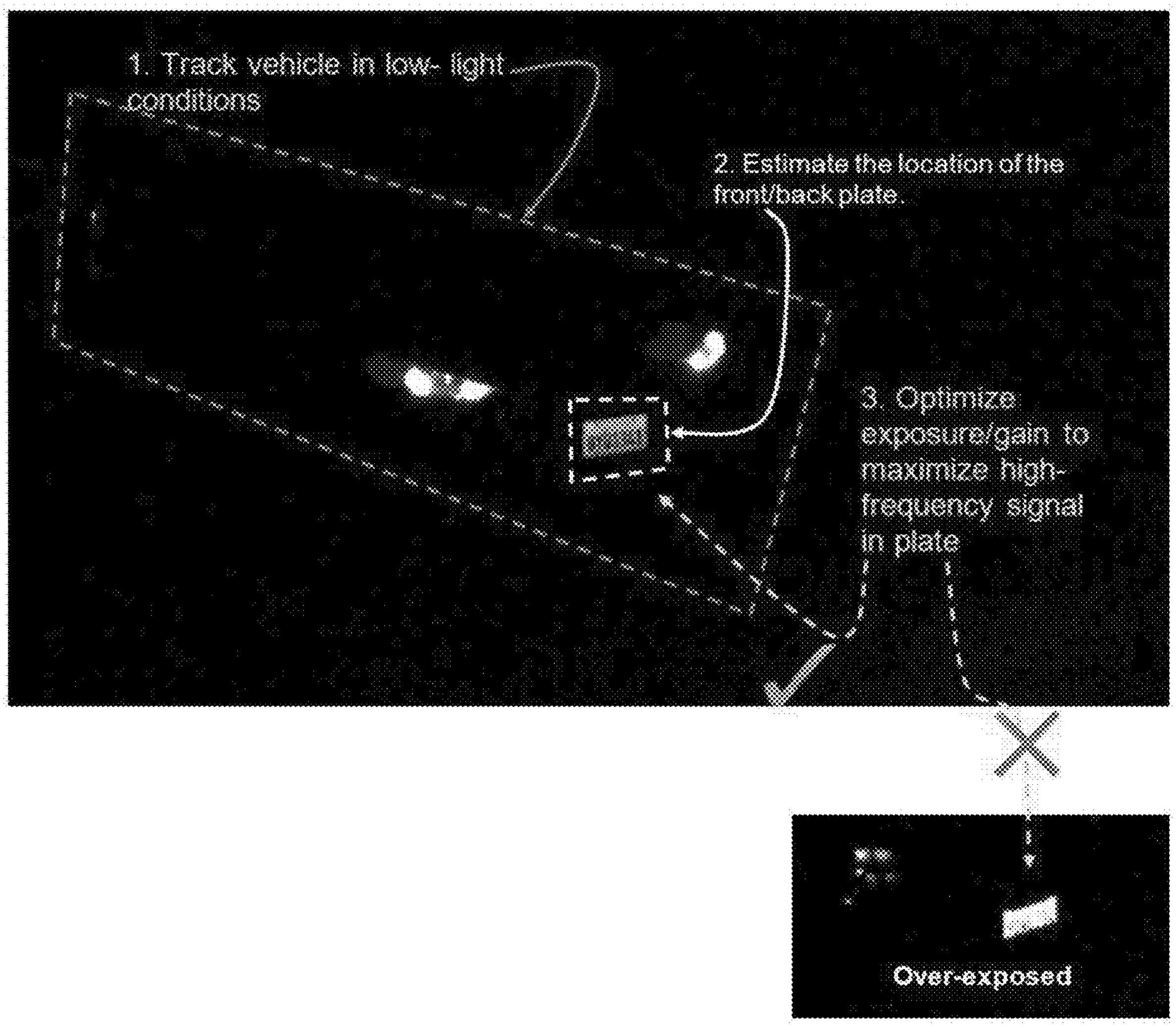
FIG. 6 illustrates an exposure/gain of part of a video frame being dynamically adjusted to optimize the video frame for automated license plate recognition.

FIG. 6 illustrates an exposure/gain of part of a video frame being dynamically adjusted to optimize at least part of the video frame for automated license plate recognition. An offending vehicle can be captured by one of the cameras 200 (e.g., the rear LPR camera 212B) passing the school bus 102 in low-light conditions. The vehicle can be detected and tracked by the vehicle detection deep learning model 508 and the vehicle tracker 510 as part of the multi-stream tracking pipeline 408 (see, e.g., FIG. 5).

As shown in FIG. 6, the auto exposure algorithm 516 can estimate the location of the license plate of the offending vehicle (e.g., the front license plate, or the back license plate in situations where only the back license plate is visible) by taking into account image coordinates from the tracklet 512 of the offending vehicle (e.g., image coordinates of the vehicle bounding polygon) and known constraints associated with the road geometry and the fact that a license plate is situated along either the front or back bumper region. Once the auto exposure algorithm 516 has estimated the location of the license plate, the auto exposure algorithm 516 can ignore most of the remainder of the video frame and focus on optimizing the exposure/gain around the estimated location of the license plate. The auto exposure algorithm 516 can reduce license blur by optimizing for entropy metrics within a dilated instance of the vehicle bounding polygon. In some embodiments, the auto exposure algorithm 516 can optimize the exposure/gain by maximizing a high-frequency signal around the estimated location of the license plate. The exposure/gain can be optimized to prevent over-exposure (or under-exposure in some cases). Once the exposure/gain of the video frame has been optimized, the video frame can be provided as an input to the ALPR deep learning model 420 for automated license plate recognition. As previously discussed, the automated license plate recognition procedure can be part of the asynchronous processing stage 402 (which can be undertaken in batch mode once the school bus 102 resumes its driving route).

Figure 7A:
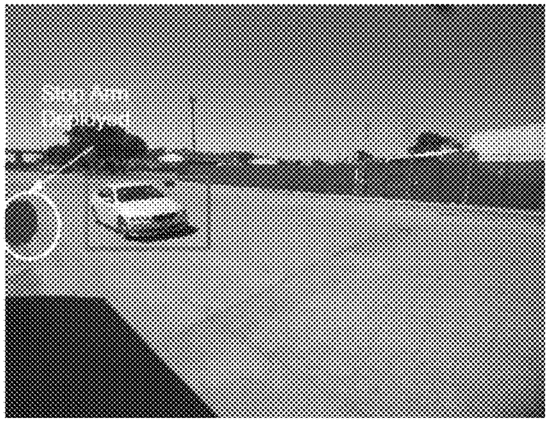
FIGS. 7A-7B illustrate example context video frame images showing an offending vehicle committing a school bus stop-arm violation by passing a stopped school bus from the rear.
Figure 7B:
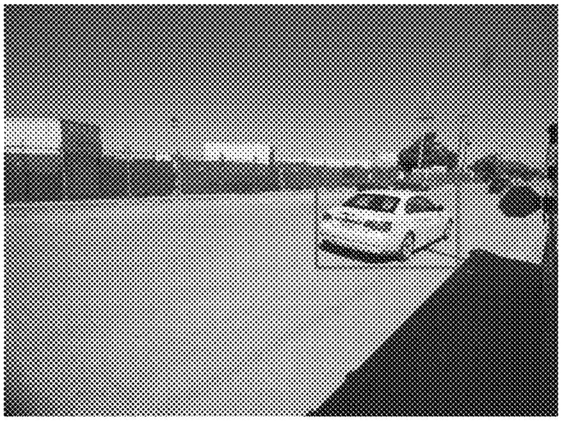

FIGS. 7A-7B illustrate example context video frame images showing an offending vehicle committing a school bus stop-arm violation by passing a stopped school bus 102 from the rear. FIG. 7A illustrates an example context video frame image captured by the rear context camera 210B as the offending vehicle begins to pass the stopped school bus 102 from the rear. As shown in FIG. 7A, a deployed rear stop-arm of the school bus 102 is shown in the context video frame and the offending vehicle is automatically detected by a vehicle detection deep learning model 508 and bounded by a vehicle bounding polygon.

FIG. 7B illustrates an example context video frame image captured by the front context camera 210A as the offending vehicle passes the school bus 102. As shown in FIG. 7B, a deployed front stop-arm of the school bus 102 is shown in the context video frame and the offending vehicle is automatically detected by the vehicle detection deep learning model 508 and bounded by a vehicle bounding polygon.

Figure 7C:
FIGS. 7C-7D illustrate example LPR video frame images showing a license plate number of the offending vehicle recognized by an automated license plate recognition (ALPR) deep learning model.
Figure 7D:
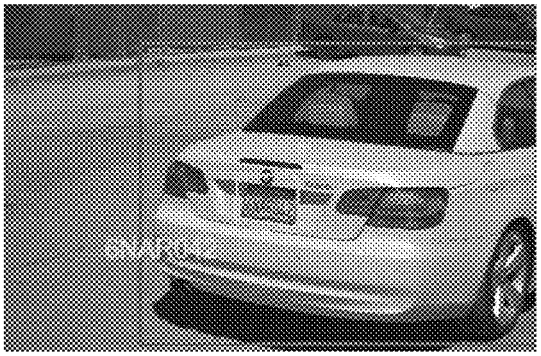

FIGS. 7C-7D illustrate example LPR video frame images showing a license plate number 136 of the offending vehicle being recognized by an automated license plate recognition (ALPR) deep learning model 420.

FIG. 7C illustrates an example LPR video frame image captured by the rear LPR camera 212B as the offending vehicle begins to pass the stopped school bus 102 from the rear. As shown in FIG. 7C, the license plate number 136 can be automatically recognized from a front license plate of the offending vehicle. The front license plate can be automatically detected and bounded by a license plate bounding polygon. The license plate number 136 (i.e., the alphanumeric characters making up the license plate number 136) can then be automatically recognized by the ALPR deep learning model 420 running on the control unit 116.

FIG. 7D illustrates an example LPR video frame image captured by the front LPR camera 212A as the offending vehicle passes the school bus 102. As shown in FIG. 7D, the license plate number 136 can be automatically recognized from a rear license plate of the offending vehicle. The rear license plate can be automatically detected and bounded by a license plate bounding polygon. The license plate number 136 (i.e., the alphanumeric characters making up the license plate number 136) can then be automatically recognized by the ALPR deep learning model 420 running on the control unit 116.

A number of embodiments have been described. Nevertheless, it will be understood by one of ordinary skill in the art that various changes and modifications can be made to this disclosure without departing from the spirit and scope of the embodiments. Elements of systems, devices, apparatus, and methods shown with any embodiment are exemplary for the specific embodiment and can be used in combination or otherwise on other embodiments within this disclosure. For example, the steps of any methods depicted in the figures or described in this disclosure do not require the particular order or sequential order shown or described to achieve the desired results. In addition, other steps operations may be provided, or steps or operations may be eliminated or omitted from the described methods or processes to achieve the desired results. Moreover, any components or parts of any apparatus or systems described in this disclosure or depicted in the figures may be removed, eliminated, or omitted to achieve the desired results. In addition, certain components or parts of the systems, devices, or apparatus shown or described herein have been omitted for the sake of succinctness and clarity.

Accordingly, other embodiments are within the scope of the following claims and the specification and/or drawings may be regarded in an illustrative rather than a restrictive sense.

Each of the individual variations or embodiments described and illustrated herein has discrete components and features which may be readily separated from or combined with the features of any of the other variations or embodiments. Modifications may be made to adapt a particular situation, material, composition of matter, process, process act(s) or step(s) to the objective(s), spirit, or scope of the present invention.

Methods recited herein may be carried out in any order of the recited events that is logically possible, as well as the recited order of events. Moreover, additional steps or operations may be provided or steps or operations may be eliminated to achieve the desired result.

Furthermore, where a range of values is provided, every intervening value between the upper and lower limit of that range and any other stated or intervening value in that stated range is encompassed within the invention. Also, any optional feature of the inventive variations described may be set forth and claimed independently, or in combination with any one or more of the features described herein. For example, a description of a range from 1 to 5 should be considered to have disclosed subranges such as from 1 to 3, from 1 to 4, from 2 to 4, from 2 to 5, from 3 to 5, etc. as well as individual numbers within that range, for example 1.5, 2.5, etc. and any whole or partial increments therebetween.

All existing subject matter mentioned herein (e.g., publications, patents, patent applications) is incorporated by reference herein in its entirety except insofar as the subject matter may conflict with that of the present invention (in which case what is present herein shall prevail). The referenced items are provided solely for their disclosure prior to the filing date of the present application. Nothing herein is to be construed as an admission that the present invention is not entitled to antedate such material by virtue of prior invention.

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise, all technical and scientific terms used herein have the same meaning as commonly understood by one of ordinary skill in the art to which this invention belongs.

Reference to the phrase "at least one of", when such phrase modifies a plurality of items or components (or an enumerated list of items or components) means any combination of one or more of those items or components. For example, the phrase "at least one of A, B, and C" means: (i) A; (ii) B; (iii) C; (iv) A, B, and C; (v) A and B; (vi) B and C; or (vii) A and C.

In understanding the scope of the present disclosure, the term "comprising" and its derivatives, as used herein, are intended to be open-ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" "element," or "component" when used in the singular can have the dual meaning of a single part or a plurality of parts. As used herein, the following directional terms "forward, rearward, above, downward, vertical, horizontal, below, transverse, laterally, and vertically" as well as any other similar directional terms refer to those positions of a device or piece of equipment or those directions of the device or piece of equipment being translated or moved.

Finally, terms of degree such as "substantially", "about" and "approximately" as used herein mean the specified value or the specified value and a reasonable amount of deviation from the specified value (e.g., a deviation of up to +0.1%, +1%, +5%, or +10%, as such variations are appropriate) such that the end result is not significantly or materially changed. For example, "about 1.0 cm" can be interpreted to mean "1.0 cm" or between "0.9 cm and 1.1 cm." When terms of degree such as "about" or "approximately" are used to refer to numbers or values that are part of a range, the term can be used to modify both the minimum and maximum numbers or values.

The term "engine" or "module" as used herein can refer to software, firmware, hardware, or a combination thereof. In the case of a software implementation, for instance, these may represent program code that performs specified tasks when executed on a processor (e.g., CPU, GPU, or processor cores therein). The program code can be stored in one or more computer-readable memory or storage devices. Any references to a function, task, or operation performed by an "engine" or "module" can also refer to one or more processors of a device or server programmed to execute such program code to perform the function, task, or operation.

It will be understood by one of ordinary skill in the art that the various methods disclosed herein may be embodied in a non-transitory readable medium, machine-readable medium, and/or a machine accessible medium comprising instructions compatible, readable, and/or executable by a processor or server processor of a machine, device, or computing device. The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

This disclosure is not intended to be limited to the scope of the particular forms set forth, but is intended to cover alternatives, modifications, and equivalents of the variations or embodiments described herein. Further, the scope of the disclosure fully encompasses other variations or embodiments that may become obvious to those skilled in the art in view of this disclosure.

We claim:

1. A method of automatically detecting a school bus stop-arm violation, comprising:
 - executing, on a control unit coupled to a camera hub, a real-time recording and tracking stage comprising:
   - initiating capture by a plurality of cameras of the camera hub responsive to receiving a first signal indicating that a deployment status of at least one stop-arm of the school bus is extended;
   - detecting and tracking a vehicle via a multi-stream tracking pipeline that includes inputting videos captured by the plurality of cameras to a vehicle detection deep learning model and to a vehicle tracker running on the control unit communicatively coupled to the camera hub to detect the vehicle and to generate a tracked vehicle trajectory across the plurality of cameras as the vehicle passes the school bus while the the at least one stop-arm is extended; and
   - terminating capture by the plurality of cameras responsive to receiving a second signal indicating that the deployment status of the at least one stop-arm of the school bus is retracted;
 - executing, on the control unit, an asynchronous processing stage comprising:
   - initiating the asynchronous processing stage responsive to receiving a third signal indicating that the school bus is moving;
   - generating, from the tracked vehicle trajectory, a full-scene track of the vehicle, the full-scene track including a collection of data indicative of movement of the vehicle as the vehicle enters a field of view of the plurality of cameras, passes the school bus while the school bus is stopped with the at least one stop-arm extended, and exits the field of view of the plurality of cameras;
   - using the full-scene track of the vehicle to identify video portions from the videos captured by the plurality of cameras corresponding to the vehicle during a violation interval associated with the at least one stop-arm being extended;
   - automatically recognizing a license plate number of a license plate of the vehicle from the identified video portions using an automated license plate recognition (ALPR) deep learning model running on the control unit; and
   - generating an evidence package based on the full-scene track, the evidence package comprising the identified video portions captured by the plurality of cameras and the license plate number of the vehicle; and
 - executing an asynchronous cloud and processing review stage comprising:
   - analyzing, at a server remote from the camera hub, the video portions in the evidence package to detect and to remove false positive results.

2. The method of claim 1, wherein tracking the vehicle further comprises:
 - generating tracklets of the vehicle detected from one or more videos captured by each of the cameras, wherein each of the tracklets is a sequence of image coordinates of the vehicle detected from the one or more videos; and
 - generating the full-scene track of the vehicle across the plurality of cameras using the image coordinates from the tracklets.

3. The method of claim 2, wherein generating the full-scene track further comprises estimating image coordinates of the license plate of the vehicle across multiple videos.

4. The method of claim 3, wherein generating the full-scene track further comprises associating the image coordinates from at least one of the tracklets with one or more of the other tracklets using a homography transform algorithm.

5. The method of claim 2, further comprising generating the full-scene track of the vehicle while the school bus is in motion and the at least one stop-arm of the school bus is retracted.

6. The method of claim 1, wherein automatically recognizing the license plate number further comprises:
 - obtaining predictions from the ALPR deep learning model concerning license plate numbers and confidence values associated with the predictions; and
 - selecting one license plate number based on the predictions and the confidence values.

7. The method of claim 1, further comprising dynamically adjusting an exposure and gain of a video frame of one of the videos by estimating a location of the license plate of the vehicle.

8. A system for automatically detecting a school bus stop-arm violation, comprising:
 - a camera hub configured to be coupled to an exterior side of a school bus in between two immediately adjacent windows of the school bus, the camera hub comprising a plurality of cameras configured to capture videos of a vehicle while the school bus is stopped and at least one stop-arm of the school bus is extended; and
 - a control unit communicatively coupled to the camera hub, wherein the control unit comprises one or more processors programmed to execute instructions to:
   - execute a real-time recording and tracking stage comprising:
     - initiating capture by a plurality of cameras of the camera hub responsive to receiving a first signal indicating that a deployment status of at least one stop-arm of the school bus is extended;
     - detecting and tracking a vehicle via a multi-stream tracking pipeline that includes inputting videos captured by the plurality of cameras to a vehicle detection deep learning model and to a vehicle tracker running on the control unit to detect the vehicle and to generate a tracked vehicle trajectory across the plurality of cameras as the vehicle passes the school bus while the at least one stop-arm is extended; and
     - terminating capture by the plurality of cameras responsive to receiving a second signal indicating that the deployment status of the at least one stop-arm of the school bus is retracted;

execute an asynchronous processing stage comprising:

initiating the asynchronous processing stage responsive to receiving a third signal indicating that the school bus is moving;

generating, from the tracked vehicle trajectory, a full-scene track of the vehicle, the full-scene track including a collection of data indicative of movement of the vehicle as the vehicle enters a field of view of the plurality of cameras, passes the school bus while the school bus is stopped with the at least one stop-arm extended, and exits the field of view of the plurality of cameras;

using the full-scene track of the vehicle to identify video portions from the videos captured by the plurality of cameras corresponding to the vehicle during a violation interval associated with the at least one stop-arm being extended;

automatically recognizing a license plate number of a license plate of the vehicle from the identified video portions using an automated license plate recognition (ALPR) deep learning model running on the control unit; and generate an evidence package based on the full-scene track, the evidence package comprising the identified video portions captured by the plurality of cameras and the license plate number of the vehicle; and transmit the evidence package to a server remote from the camera hub for an asynchronous cloud and processing review stage that includes analyzing the video portions in the evidence package to detect and to remove false positive results.

9. The system of claim 8, wherein tracking the vehicle with the control unit further comprises executing instructions to:

generate tracklets of the vehicle detected from one or more videos captured by each of the cameras, wherein each of the tracklets is a sequence of image coordinates of the vehicle detected from the one or more videos; and generate a full-scene track of the vehicle across the plurality of cameras using the image coordinates from the tracklets.

10. The system of claim 9, wherein generating the full-scene track with the control unit further comprises executing instructions to estimate image coordinates of the license plate of the vehicle across multiple videos.

11. The system of claim 10, wherein generating the full-scene track with the control unit further comprises executing instructions to associate the image coordinates from at least one of the tracklets with one or more of the other tracklets using a homography transform algorithm.

12. The system of claim 9, wherein the control unit is further configured execute instructions to generate the full-scene track of the vehicle while the school bus is in motion.

13. The system of claim 8, wherein automatically recognizing the license plate number with the control unit further comprises executing instructions to:

obtain predictions from the ALPR deep learning model concerning license plate numbers and confidence values associated with the predictions; and select one license plate number based on the predictions and the confidence values.

14. One or more non-transitory computer-readable media comprising instructions stored thereon, that when executed by one or more processors, perform steps, comprising:

executing a real-time recording and tracking stage comprising:

initiating capture by a plurality of cameras of a camera hub responsive to receiving a first signal indicating that a deployment status of at least one stop-arm of a school bus is extended, the camera hub configured to be coupled to a school bus;

detecting and tracking a vehicle via a multi-stream tracking pipeline that includes inputting videos captured by the plurality of cameras to a vehicle detection deep learning model and to a vehicle tracker to detect the vehicle and to generate a tracked vehicle trajectory across the plurality of cameras as the vehicle passes the school bus while the at least one stop-arm of the school bus is extended; and terminating capture by the plurality of cameras responsive to receiving a second signal indicating that the deployment status of the at least one stop-arm of the school bus is retracted;

executing an asynchronous processing stage comprising:

initiating the asynchronous processing stage responsive to receiving a third signal indicating that the school bus is moving;

generating, from the tracked vehicle trajectory, a full-scene track of the vehicle, the full-scene track including a collection of data indicative of movement of the vehicle as the vehicle enters a field of view of the plurality of cameras, passes the school bus while the school bus is stopped with the at least one stop-arm extended, and exits the field of view of the plurality of cameras;

using the full-scene track of the vehicle to identify video portions from the videos captured by the plurality of cameras corresponding to the vehicle during a violation interval associated with the at least one stop-arm being extended;

automatically recognizing a license plate number of a license plate of the vehicle from the identified video portions using an automated license plate recognition (ALPR) deep learning model; and generating an evidence package based on the full-scene track, the evidence package comprising the identified video portions captured by the plurality of cameras and the license plate number of the vehicle; and transmitting the evidence package to a server remote from the camera hub for an asynchronous cloud and processing review stage that includes analyzing the video portions in the evidence package to detect and to remove false positive results.

15. The one or more non-transitory computer-readable media of claim 14, wherein tracking the vehicle further comprises performing the steps of:

generating tracklets of the vehicle detected from one or more videos captured by each of the cameras, wherein each of the tracklets is a sequence of image coordinates of the vehicle detected from the one or more videos; and generating a full-scene track of the vehicle across the plurality of cameras using the image coordinates from the tracklets.

16. The one or more non-transitory computer-readable media of claim 15, wherein generating the full-scene track further comprises performing the steps of estimating image coordinates of the license plate of the vehicle across multiple videos.

17. The one or more non-transitory computer-readable media of claim 16, wherein generating the full-scene track further comprises performing the steps of associating the image coordinates from at least one of the tracklets with one or more of the other tracklets using a homography transform algorithm.

18. The one or more non-transitory computer-readable media of claim 14, wherein automatically recognizing the license plate number further comprises performing the steps of:

obtaining predictions from the ALPR deep learning model concerning license plate numbers and confidence values associated with the predictions; and selecting one license plate number based on the predictions and the confidence values.

* * * * *